US012587743B2

(12) United States Patent
Okada et al.

(10) Patent No.: US 12,587,743 B2
(45) Date of Patent: Mar. 24, 2026

(54) POSITION DETECTION AND CONTROL OF A MOVABLE BODY INCLUDING AN OPTICAL ELEMENT

(71) Applicant: Asahi Kasei Microdevices Corporation, Tokyo (JP)

(72) Inventors: Keita Okada, Tokyo (JP); Yuki Kitamoto, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 146 days.

(21) Appl. No.: 18/493,808

(22) Filed: Oct. 25, 2023

(65) Prior Publication Data

US 2024/0179409 A1 May 30, 2024

(30) Foreign Application Priority Data

Nov. 30, 2022 (JP) .................................. 2022-191147

(51) Int. Cl.
| | |
|---|---|
| *H04N 23/68* | (2023.01) |
| *H04N 23/55* | (2023.01) |
| *H04N 23/67* | (2023.01) |

(52) U.S. Cl.
CPC ......... *H04N 23/6812* (2023.01); *H04N 23/55* (2023.01); *H04N 23/67* (2023.01); *H04N 23/687* (2023.01)

(58) Field of Classification Search
CPC .... H04N 23/6812; H04N 23/55; H04N 23/67; H04N 23/687; H04N 23/00; H04N 23/54; H04N 23/685
See application file for complete search history.

(56) References Cited

U.S. PATENT DOCUMENTS

| | | | | |
|---|---|---|---|---|
| 7,881,598 B1 * | 2/2011 | Wu | ........................... | G03B 3/10 |
| | | | | 396/55 |
| 11,683,588 B2 * | 6/2023 | Tabuchi | ............. | H02K 41/0356 |
| | | | | 348/208.2 |
| 2005/0258822 A1 | 11/2005 | Hara | | |

(Continued)

FOREIGN PATENT DOCUMENTS

| | | |
|---|---|---|
| CN | 105573014 A | 5/2016 |
| EP | 2840770 A2 | 2/2015 |

(Continued)

*Primary Examiner* — Padma Haliyur

(57) ABSTRACT

Provided is an IC chip comprising: a plurality of magnetic sensors which detect magnetic fields according to positions of the movable body in the first direction and the second direction; a first position information setting unit which calculates a first relative position of the movable body with respect to a first drive range in the first direction in accordance with the magnetic fields detected by the plurality of magnetic sensors; a second position information setting unit which calculates a second relative position of the movable body with respect to a second drive range in the second direction in accordance with the magnetic fields detected by the plurality of magnetic sensors, a first target position adjustment unit which calculates a first target position in the first drive range; and a second target position adjustment unit which calculates a second target position in the second drive range.

16 Claims, 24 Drawing Sheets

(56) References Cited

U.S. PATENT DOCUMENTS

| | | | | | |
|---|---|---|---|---|---|
| 2009/0237074 | A1* | 9/2009 | Kou | | H10N 50/10 |
| | | | | | 324/247 |
| 2011/0043197 | A1* | 2/2011 | Trontelj | | G01B 7/30 |
| | | | | | 324/207.25 |
| 2011/0176012 | A1 | 7/2011 | Yagisawa | | |
| 2012/0114322 | A1 | 5/2012 | Saito | | |
| 2014/0205274 | A1* | 7/2014 | Wu | | G02B 27/646 |
| | | | | | 396/55 |
| 2015/0312468 | A1* | 10/2015 | Taylor | | H04N 13/378 |
| | | | | | 348/47 |
| 2015/0350507 | A1* | 12/2015 | Topliss | | H04N 23/687 |
| | | | | | 348/208.2 |
| 2016/0327806 | A1* | 11/2016 | Kasamatsu | | G02B 27/646 |
| 2018/0249082 | A1 | 8/2018 | Saito | | |
| 2018/0275369 | A1* | 9/2018 | Takahashi | | G03B 3/10 |
| 2018/0284568 | A1 | 10/2018 | Oh | | |
| 2018/0292670 | A1 | 10/2018 | Takahashi | | |
| 2018/0343393 | A1 | 11/2018 | Maede | | |
| 2018/0352161 | A1 | 12/2018 | Heo | | |
| 2019/0204531 | A1 | 7/2019 | Sugawara | | |
| 2020/0153366 | A1 | 5/2020 | I | | |
| 2020/0174219 | A1 | 6/2020 | Sugawara | | |
| 2021/0011299 | A1* | 1/2021 | Matsui | | G01C 19/00 |
| 2021/0333567 | A1 | 10/2021 | Jeong | | |
| 2021/0333568 | A1* | 10/2021 | Okada | | G03B 5/00 |
| 2022/0174198 | A1* | 6/2022 | Wang | | H04N 23/51 |
| 2022/0224839 | A1 | 7/2022 | Maede | | |
| 2022/0294937 | A1* | 9/2022 | Furukawa | | G06F 1/163 |
| 2023/0388619 | A1* | 11/2023 | Yokobori | | G02B 27/646 |

FOREIGN PATENT DOCUMENTS

| | | | |
|---|---|---|---|
| JP | 2005242326 | A | 9/2005 |
| JP | 2007114121 | A | 5/2007 |
| JP | 2014085629 | A | 5/2014 |
| JP | 2018200457 | A | 12/2018 |
| JP | 7138261 | B1 | 9/2022 |
| JP | 7190604 | B1 | 12/2022 |
| KR | 20200020325 | A | 2/2020 |

* cited by examiner

POSITION DETECTION AND CONTROL OF A MOVABLE BODY INCLUDING AN OPTICAL ELEMENT

The contents of the following patent application(s) are incorporated herein by reference:

NO. 2022-191147 filed in JP on Nov. 30, 2022

BACKGROUND

1. Technical Field

The present invention relates to an IC chip, a camera module, and a position control system.

2. Related Art

An actuator, a lens drive apparatus, a lens control apparatus, a camera module, and a position detection apparatus are known which detect positions of a movable body on a plurality of axes (see Patent Documents 1, 2, and 3).

PRIOR ART DOCUMENT

Patent Document

Patent Document 1: International Publication No. 2021/065679

Patent Document 2: Japanese Patent Application Publication No. 2019-120747

Patent Document 3: Japanese Patent No. 6695898

Patent Document 4: Japanese Patent Application Publication No. 2021-051277

Patent Document 5: Japanese Patent Application Publication No. 2012-103497

Patent Document 6: Japanese Patent Application Publication No. 2007-114121

DESCRIPTION OF EXEMPLARY EMBODIMENTS

Figure 1A:
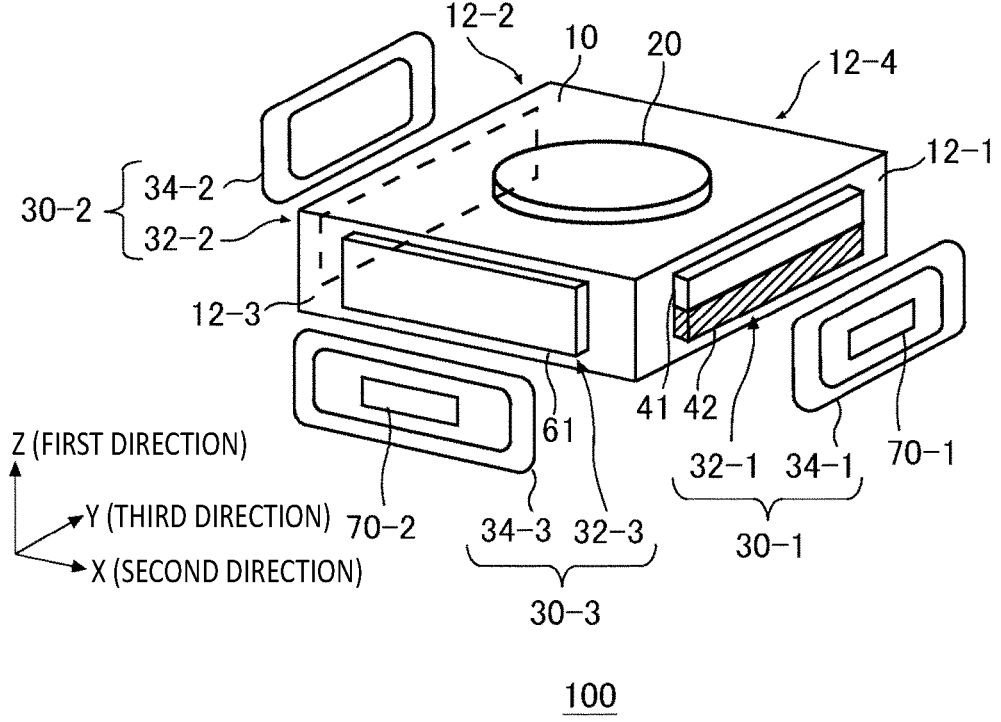
FIG. 1A is a perspective view showing an example of a camera module 100 according to a first embodiment of the present invention.

Hereinafter, the present invention will be described through embodiments of the invention, but the following embodiments do not limit the invention according to claims. In addition, not all combinations of features described in the embodiments are essential to solutions of the invention. In addition, description of the same components may be omitted by assigning them the same reference numerals.

In the present specification, one side in a direction parallel to an optical axis of a lens may be referred to as "upper" and the other side is referred to as "lower". "Upper" and "lower" directions are not limited to a direction parallel to the gravitational direction.

In the present specification, a case where a size or an amount is described as "same" or "equal" may include a case where there is an error due to a variation in manufacturing or the like. The error is, for example, within 5%. In addition, a case where an angle is described as "parallel", "perpendicular", or "orthogonal" may include a case where there is an error due to a variation in manufacturing or the like. The error is, for example, within 5 degrees.

FIG. 1A is a perspective view showing an example of a camera module 100 according to a first embodiment of the present invention. The camera module 100 is provided in a camera or a portable apparatus with a camera function. The camera module 100 includes a movable body 10 including an optical element 20. The optical element 20 is a lens or an image capturing unit such as a CMOS image sensor. The movable body 10 adjusts a relative position between the lens and the image capturing unit by moving one of the lens and the image capturing unit with respect to the other. In each embodiment, an example will be described in which the movable body 10 includes a lens and moves the lens, but the movable body 10 may include an image capturing unit and move the image capturing unit. In a case where the movable body 10 moves the image capturing unit, the camera module 100 has a function and a configuration similar to those for the case where the movable body 10 moves the lens. In the present specification, an axis parallel to an optical axis of the optical element 20 (the lens in the present example) is referred to as a Z axis, and two axes orthogonal to the Z axis are referred to as an X axis and a Y axis. The X axis and the Y axis are orthogonal to each other. In the present specification, the optical axis of the optical element 20 may be simply referred to as the optical axis. The image capturing unit such as the CMOS image sensor which receives light having passed through the lens is provided below the lens (on a negative direction side on the Z axis), but illustration thereof is omitted in FIG. 1A. The optical axis of the lens is an axis which connects a focal position and a central point on an XY plane of the lens. A normal to an upper surface of the lens at the central point on the XY plane of the lens may be defined as the optical axis. In addition, also in a case where the image capturing unit is provided as the optical element 20, the optical axis of the lens may be treated as the optical axis of the optical element 20. In another example, a normal to an image capturing surface of the image capturing unit at a center of the image capturing surface may be defined as the optical axis of the optical element 20.

The movable body 10 has a plurality of surfaces 12. As an example, a surface 12 is a surface parallel to the optical axis of the optical element 20, but the surface 12 may have an angle with respect to the optical axis. In the example shown in FIG. 1A, the movable body 10 is a cuboid or a cube, and has four surfaces 12 including a first surface 12-1 to a fourth surface 12-4 which are side surfaces parallel to the optical axis. In another example, the movable body 10 may have three surfaces 12, or may have five or more surfaces 12. Each surface 12 in the example shown in FIG. 1A is perpendicular to either the Y axis or the X axis. In the example shown in FIG. 1A, the first surface 12-1 and a second surface 12-2 are parallel to a YZ plane, and a third surface 12-3 and the fourth surface 12-4 are parallel to a XZ plane. Each surface 12 is planar, but may include a curved portion or a concavo-convex portion.

The movable body 10 is provided to be able to move in at least two directions. The movable body 10 may be able to move in the direction parallel to the optical axis. Moving the movable body 10 in the direction parallel to the optical axis can, for example, control the focal position of the optical element 20. In addition, the movable body 10 may be able to move in a direction intersecting the optical axis. Intersecting refers to not being parallel. The movable body 10 may be able to move in one or more directions orthogonal to the optical axis. Moving the movable body 10 in a direction different from that of the optical axis can offset a vibration of an apparatus provided with the camera module 100, to capture an image with less blur. The movable body 10 in the present example is able to move in directions of at least two of the X axis, the Y axis, or the Z axis. The movable body 10 may be provided with one of the lens and the image capturing unit, and may not be provided with the other. As a result, movement of the movable body 10 relatively moves one of the lens and the image capturing unit with respect to the other.

The camera module 100 includes one or more IC chips 70 which will be described later. Each IC chip 70 controls any one of or a plurality of drive units 30. A drive unit 30 generates a drive force for moving the movable body 10. The drive unit 30 may move the movable body 10 by a magnetic force, may move the movable body 10 by using a piezo-electric element, may move the movable body 10 through expansion and contraction using a shape memory alloy (SMA), or may move the movable body 10 by another method. In the present example, at least one drive unit 30 moves the movable body 10 by the magnetic force. All the drive units 30 may move the movable body 10 by the magnetic force.

The camera module 100 in the present example includes an IC chip 70-1 and an IC chip 70-2. The IC chip 70-1 in the present example controls the drive unit 30 to move the movable body 10 along two axes. The IC chip 70-1 in the present example controls a first drive unit 30-1 and a second drive unit 30-2 to move the movable body 10 along the Z axis and the X axis.

The IC chip 70-2 in the present example controls the drive unit 30 to move the movable body 10 along one axis. The IC chip 70-2 in the present example controls a third drive unit 30-3 to move the movable body 10 along the Y axis.

The first drive unit 30-1 has a portion arranged on the first surface 12-1 of the movable body 10, and generates a first drive force for driving the movable body 10 in a first direction. The first drive force may be the magnetic force. The second drive unit 30-2 has a portion arranged on the second surface 12-2 of the movable body 10 different from the first surface 12-1, and generates a second drive force for driving the movable body 10 in a second direction intersecting the first direction. The third drive unit 30-3 has a portion arranged on the third surface 12-3 of the movable body 10, and generates a third drive force for moving the movable body 10 in a third direction. The first direction may be a direction perpendicular to the first surface 12-1, may be the direction parallel to the optical axis, or may be another direction. The second direction may be a direction perpendicular to the second surface 12-2, may be the direction parallel to the optical axis, or may be another direction. The third direction may be a direction perpendicular to the third surface 12-3, may be the direction parallel to the optical axis, or may be another direction. In the example shown in FIG. 1A, the first drive unit 30-1 moves the movable body 10 in the first direction parallel to the optical axis. In addition, the second drive unit 30-2 moves the movable body 10 in the second direction perpendicular to the second surface 12-2. In addition, the third drive unit 30-3 moves the movable body 10 in the third direction perpendicular to the third surface 12-3. The first direction, the second direction, and the third direction intersect one another. The first direction, the second direction, and the third direction may be any one of an X axis direction, a Y axis direction, and a Z axis direction. In the example shown in FIG. 1A, the first direction is the Z axis direction, the second direction is the X axis direction, and the third direction is the Y axis direction.

The first drive unit 30-1 in the present example has a first magnet 32-1 and a first magnetic field generation unit 34-1. One of the first magnet 32-1 and the first magnetic field generation unit 34-1 is provided on the first surface 12-1 of the movable body 10, and the other of the first magnet 32-1 and the first magnetic field generation unit 34-1 is provided at a position facing the first surface 12-1. The camera module 100 has a fixed portion including a surface facing one or more surfaces 12 of the movable body 10, but illustration thereof is omitted in FIG. 1A. The movable body 10 may have the first magnet 32-1. In the example shown in FIG. 1A, the movable body 10 is provided with the first magnet 32-1, and the fixed portion is provided with the first magnetic field generation unit 34-1. In another example, the fixed portion may be provided with the first magnet 32-1, and the movable body 10 may be provided with the first magnetic field generation unit 34-1. The same arrangement of the magnetic field generation unit 34 and the magnet 32 applies to the other drive units 30.

Each magnetic field generation unit 34 has, for example, a coil. Each coil winds in a surface parallel to the surface 12. That is, the magnetic field generation unit 34 generates a magnetic field perpendicular to the magnet 32. Inverting a direction of a current flowing through the coil can invert a direction of the magnetic field generated by the magnetic field generation unit 34.

The magnet 32 has a portion with a first polarity or a second polarity on a surface facing the magnetic field generation unit 34. The first polarity is one of a south pole and a north pole, and the second polarity is the other of the south pole and the north pole. In each drawing, the portion with the second polarity in the magnet 32 is hatched, and the portion with the first polarity is not hatched.

When the magnetic field generation unit 34 generates the magnetic field, an attraction force or a repulsive force is generated between the magnetic field generation unit 34 and a portion with a predetermined polarity in the magnet 32 in accordance with the direction of the magnetic field generated by the magnetic field generation unit 34. Since the magnet 32 is fixed to the movable body 10, the movable body 10 moves in either direction in accordance with the attraction force or the repulsive force generated in the magnet 32.

The first magnet 32-1 has a first portion 41 with the first polarity and a second portion 42 with the second polarity. The first magnet 32-1 has the first portion 41 and the second portion 42 on a surface facing the first magnetic field generation unit 34-1. The first portion 41 and the second portion 42 may be arranged side by side in the first direction or the second direction. The first portion 41 and the second portion 42 in the present example are arranged side by side in the Z axis direction. The first portion 41 has the first polarity, and the second portion 42 has the second polarity. The first magnet 32-1 may have the portion with the second polarity behind the first portion 41, and have the portion with the first polarity behind the second portion 42. The expression "behind the portion in the magnet 32" refers to a surface, among surfaces of each portion, on a side opposite to the surface facing the magnetic field generation unit 34.

The first magnetic field generation unit 34-1 in the present example is a first coil arranged facing the first portion 41 and the second portion 42 so as to straddle both the first portion 41 and the second portion 42. The first coil may have a central axis of a winding wire arranged so as to overlap a boundary line between the first portion 41 and the second portion 42, or may have the central axis arranged so as to deviate from the boundary line. The first magnetic field generation unit 34-1 generates a magnetic field in a direction perpendicular to the first magnet 32-1. The movable body 10 moves in the first direction in accordance with the direction of the magnetic field generated by the first magnetic field generation unit 34-1. In the example shown in FIG. 1A, the first direction is a direction parallel to the Z axis. For example, if the magnetic field generated by the first magnetic field generation unit 34-1 is directed to attract the first portion 41, the movable body 10 moves in a direction (a negative direction of the Z axis in the example shown in FIG. 1A) in which a center of the first portion 41 of the first magnet 32-1 in the Z axis direction approaches a center of the first magnetic field generation unit 34-1 in the Z axis direction. If the magnetic field generated by the first magnetic field generation unit 34-1 is directed to attract the second portion 42, the movable body 10 moves in a direction (a positive direction of the Z axis in the example shown in FIG. 1A) in which a center of the second portion 42 of the first magnet 32-1 in the Z axis direction approaches the center of the first magnetic field generation unit 34-1 in the Z axis direction. A distance by which the movable body 10 is moved can be controlled by a strength of the magnetic field generated by the magnetic field generation unit 34 (an amount of the current flowing through the coil in the present example).

Part of the second drive unit 30-2 is provided on the second surface 12-2 of the movable body 10. The second surface 12-2 in the present example is a surface facing the first surface 12-1. The second surface 12-2 may be parallel to the first surface 12-1. The movable body 10 may have a second magnet 32-2. The second drive unit 30-2 in the present example has the second magnet 32-2 provided on the second surface 12-2 of the movable body 10 and a second magnetic field generation unit 34-2.

The second magnet 32-2 has a first portion on a surface facing the second magnetic field generation unit 34-2. The second magnet 32-2 may have a second portion behind the first portion. In this case, the first portion has the first polarity or the second polarity, and the second portion has a polarity opposite to that of the first portion.

The second magnetic field generation unit 34-2 is arranged facing the first portion of the second magnet 32-2. The second magnetic field generation unit 34-2 generates a magnetic field perpendicular to the second magnet 32-2. In accordance with a direction of the magnetic field generated by the second magnetic field generation unit 34-2, an attraction force or a repulsive force is generated between the second magnet 32-2 and the second magnetic field generation unit 34-2, and the movable body 10 moves in the second direction. In the example shown in FIG. 1A, the second direction is a direction parallel to the X axis.

Part of the third drive unit 30-3 is provided on the third surface 12-3 of the movable body 10. The third surface 12-3 in the present example is a surface intersecting the second surface 12-2. The third surface 12-3 may be orthogonal to the second surface 12-2. The third drive unit 30-3 in the present example has a third magnet 32-3 provided on the third surface 12-3 of the movable body 10 and a third magnetic field generation unit 34-3.

The third magnet 32-3 has a first portion 61 on a surface facing the third magnetic field generation unit 34-3. The third magnet 32-3 may have a second portion behind the first portion 61. In this case, the first portion 61 has the first polarity or the second polarity, and the second portion has a polarity opposite to that of the first portion 61.

The third magnetic field generation unit 34-3 is arranged facing the first portion 61 of the third magnet 32-3. The third magnetic field generation unit 34-3 generates a magnetic field perpendicular to the third magnet 32-3. In accordance with a direction of the magnetic field generated by the third magnetic field generation unit 34-3, an attraction force or a repulsive force is generated between the third magnet 32-3 and the third magnetic field generation unit 34-3, and the movable body 10 moves in the third direction. In the example shown in FIG. 1A, the third direction is a direction parallel to the Y axis.

The IC chip 70-1 is provided at a position facing the first magnet 32-1. If the first magnet 32-1 is provided in the movable body 10, the IC chip 70-1 is provided in the fixed portion. If the first magnet 32-1 is provided in the fixed portion, the IC chip 70-1 is provided in the movable body 10.

The IC chip 70-1 detects a position in the first direction and a position in the second direction of the movable body 10. The IC chip 70-1 may have a plurality of magnetic sensors 72. The magnetic sensor 72 may be any magnetic sensor as long as it can detect a direction and a strength of a magnetic field. The plurality of magnetic sensors 72 of the IC chip 70-1 detect magnetic fields according to positions of the movable body 10 in the first direction and the second direction. The first direction and the second direction may be two directions among a direction parallel to, a direction perpendicular to, or a rotational direction around, an optical axis of light entering the optical element 20. The IC chip 70-1 may have at least one of a processing circuit which processes a result of detection by the magnetic sensor 72 or a driver for driving the drive unit 30. The IC chip 70-1 may be formed on a silicon substrate, or may be formed on a semiconductor substrate made of another material. The magnetic sensor 72 may be a TMR element using a tunnel magnetoresistive effect, may be a GMR element using a giant magnetoresistive effect, may be a Hall element using a Hall effect, or may be another type of sensor. The magnetic sensor 72 may be formed of a compound semiconductor, or may be formed of another material. The IC chip 70-1 in the present example detects magnetic fields from the first magnet 32-1, and detects a position of the movable body 10 based on the detected magnetic fields.

The IC chip 70-2 is provided at a position facing the third magnet 32-3. If the third magnet 32-3 is provided in the movable body 10, the IC chip 70-2 is provided in the fixed portion. If the third magnet 32-3 is provided in the fixed portion, the IC chip 70-2 is provided in the movable body 10.

The IC chip 70-2 detects a position of the movable body 10 in the third direction. The IC chip 70-2 may have one or more magnetic sensors 72. The IC chip 70-2 may have a configuration similar to that of the IC chip 70-1.

Figure 1B:
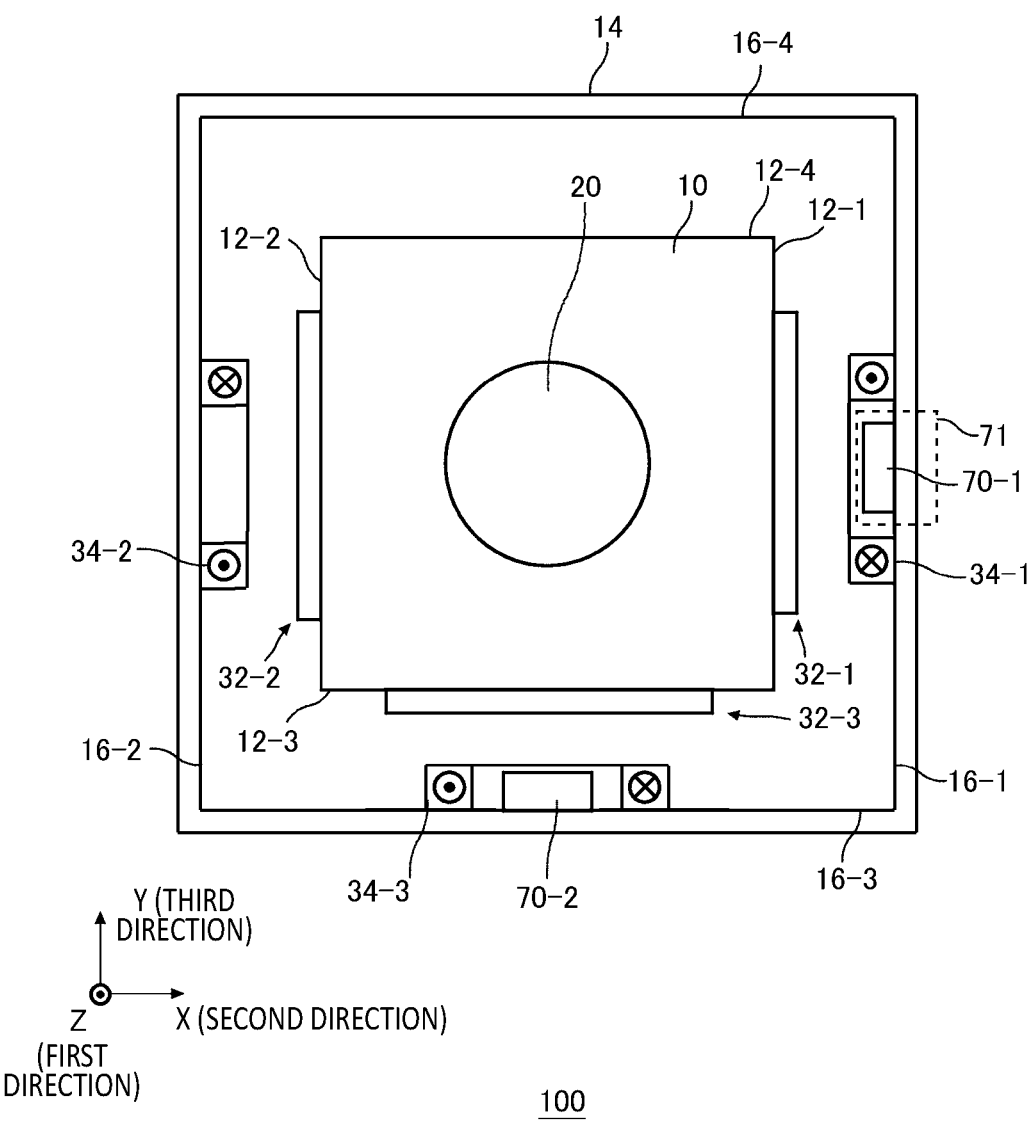
FIG. 1B is a top view showing an example of the camera module 100 according to the first embodiment of the present invention.

FIG. 1B is a top view showing an example of the camera module 100 according to the first embodiment of the present invention. FIG. 1B illustrates a fixed portion 14, the illustration of which is omitted in FIG. 1A. The fixed portion 14 has a surface 16 facing the movable body 10 in a direction intersecting the optical axis of the optical element 20. The fixed portion 14 in the present example has a first surface 16-1 facing the first surface 12-1 of the movable body 10, a second surface 16-2 facing the second surface 12-2 of the movable body 10, a third surface 16-3 facing the third surface 12-3 of the movable body 10, a fourth surface 16-4 facing the fourth surface 12-4 of the movable body 10. In the present example, the first magnetic field generation unit 34-1 and the IC chip 70-1 are provided on the first surface 16-1, the second magnetic field generation unit 34-2 is provided on the second surface 16-2, and the third magnetic field generation unit 34-3 and the IC chip 70-2 are provided on the third surface 16-3. The camera module 100 may have a position detection unit 71 which is arranged at the surface 16 of the fixed portion 14 facing the first surface 12-1 of the movable body 10 or at the first surface 12-1 of the movable body 10 and which detects the position in the first direction and the position in the second direction of the movable body 10. The position detection unit 71 may refer to the IC chip 70-1, or may include the IC chip 70-1. The position detection unit 71 has a function of compensating for an error in the position of the movable body 10 in the first direction associated with a motion in the second direction of the movable body 10 which will be described later.

Figure 2:
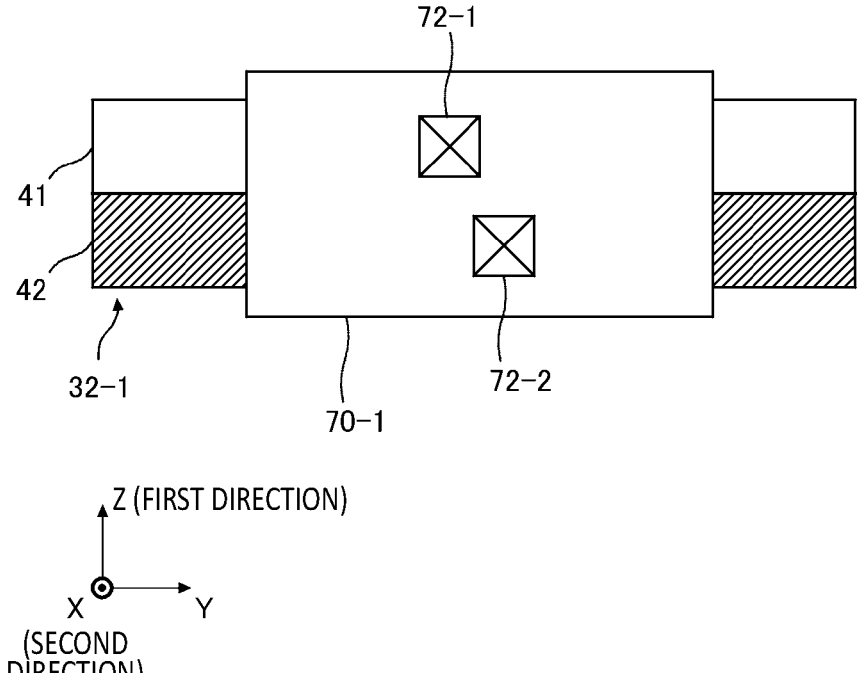
FIG. 2 shows an exemplary arrangement of a first magnet 32-1, an IC chip 70-1, and a magnetic sensor 72 in a YZ plane.

FIG. 2 shows an exemplary arrangement of the first magnet 32-1, the IC chip 70-1, and the magnetic sensor 72 in a YZ plane. The IC chip 70-1 in the present example has a first magnetic sensor 72-1 and a second magnetic sensor 72-2. The first magnet 32-1 in the present example has the first portion 41 and the second portion 42 arranged side by side in the Z axis direction (a first direction) on a surface facing the IC chip 70-1. In the present specification, the surface facing the IC chip 70-1 in the first magnet 32-1 may be referred to as an arrangement surface. The first portion 41 and the second portion 42 may have the same position and length in the Y axis direction. The first portion 41 and the second portion 42 may have the same length in the Z axis direction.

The plurality of magnetic sensors 72 include the first magnetic sensor 72-1 arranged facing the first portion 41 and the second magnetic sensor 72-2 arranged facing the second portion 42. At least two of the plurality of magnetic sensors 72 may be arranged along a direction other than the first direction and a second direction. The first magnetic sensor 72-1 and the second magnetic sensor 72-2 may be arranged side by side in the first direction (the Z axis direction). The first magnetic sensor 72-1 and the second magnetic sensor 72-2 may have the same position and length in the Y axis direction. The first magnetic sensor 72-1 and the second magnetic sensor 72-2 may have the same length in the Z axis direction. The first magnetic sensor 72-1 and the second magnetic sensor 72-2 may be arranged at positions symmetrical to each other with respect to a boundary line between the first portion 41 and the second portion 42. Magnetic field strengths detected by the first magnetic sensor 72-1 and the second magnetic sensor 72-2 change depending on a position of the movable body 10 in the first direction (the Z axis direction), and also change depending on a position of the movable body 10 in the second direction (the X axis direction).

The first magnet 32-1 may be used for driving in an optical axis direction. As a result, the first magnet 32-1 has a longer drive range than the second magnet 32-2 used for driving in a direction perpendicular to the optical axis direction, it may have a larger planar size than the second magnet 32-2. In addition, since movement in the optical axis direction is easily affected by the gravitational direction, the first magnet 32-1 may have a larger thickness than the second magnet 32-2 in order to improve the drive force.

If a position of each member is defined in the present specification, unless otherwise described, the position of each member is defined with the movable body 10 present at a predetermined origin position. An origin position in the Z axis direction is a center of a movable range of the movable body 10 in the Z axis direction. Origin positions in the X axis direction and the Y axis direction are positions of the movable body 10 for the time when a center (or an optical axis) of the optical element 20 overlaps a center of a light receiving surface in an image capturing unit below the optical element 20.

The magnetic sensor 72 of the IC chip 70-2 and the third magnet 32-3 may have configurations similar to or different from those of the magnetic sensor 72 of the IC chip 70-1 and the first magnet 32-1. The third magnet 32-3 in the present example may have a surface with a single polarity on a surface facing the IC chip 70-2. The IC chip 70-2 may have one or more magnetic sensors 72 facing the third magnet 32-3.

Figure 3:
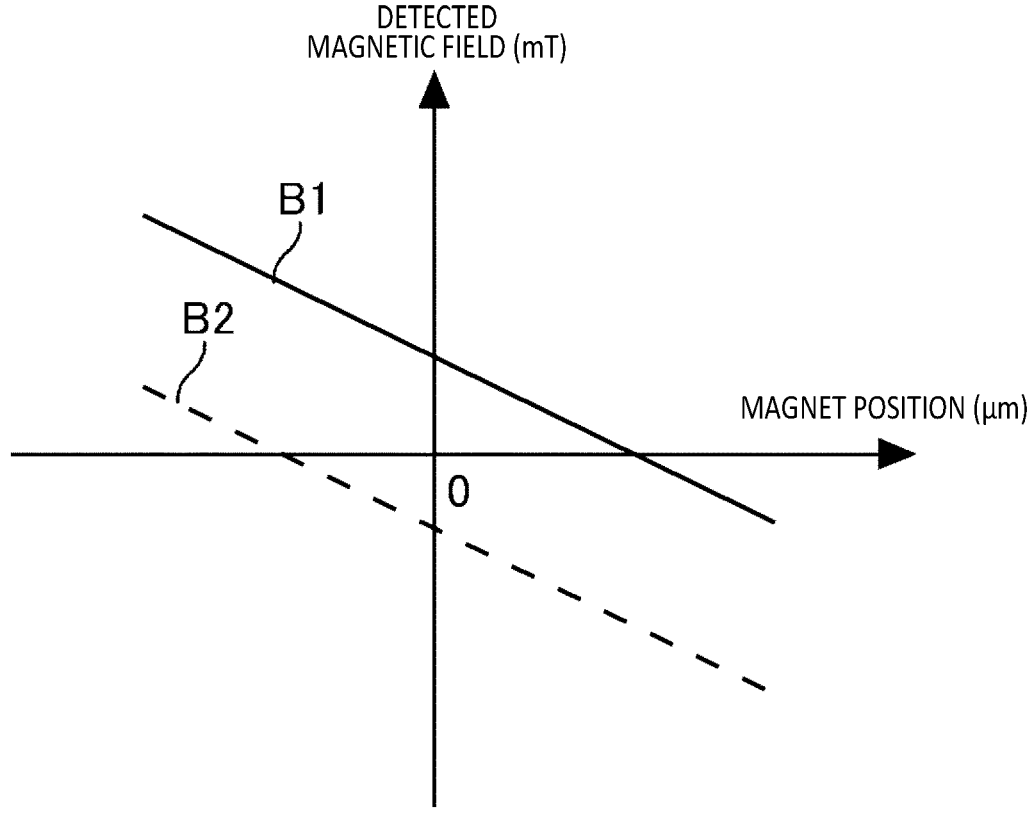
FIG. 3 shows relationships between a position of a movable body 10 in a Z axis direction and strengths of magnetic fields detected by a first magnetic sensor 72-1 and a second magnetic sensor 72-2.

FIG. 3 shows relationships between a position of a movable body 10 in the Z axis direction and strengths of magnetic fields detected by the first magnetic sensor 72-1 and the second magnetic sensor 72-2. In each diagram, the origin position of the movable body 10 described above is referred to as an origin 0. The first magnetic sensor 72-1 detects a first magnetic field strength, and the second magnetic sensor 72-2 detects a second magnetic field strength. The first magnetic field strength of the magnetic field detected by the first magnetic sensor 72-1 is referred to as B1, and the second magnetic field strength of the magnetic field detected by the second magnetic sensor 72-2 is referred to as B2. In an initial state shown in FIG. 2, the first magnetic sensor 72-1 detects a large amount of magnetic field from the first portion 41, and detects the magnetic field strength B1 which is positive. The second magnetic sensor 72-2 detects a large amount of magnetic field from the second portion 42, and detects the magnetic field strength B2 which is negative.

The movable body 10 moving in the Z axis direction changes a ratio of the magnetic field from the first portion 41 and the magnetic field from the second portion 42 which are detected by each magnetic sensor 72. For example, if the movable body 10 moves to a positive side of the Z axis from the state shown in FIG. 2, a distance between the first magnetic sensor 72-1 and the second portion 42 decreases, so that a magnetic field component from the first portion 41 included in the magnetic field detected by the first magnetic sensor 72-1 decreases, and a magnetic field component from the second portion 42 increases. Therefore, as shown in FIG. 3, when the movable body 10 moves in a positive direction of the Z axis, the first magnetic field strength B1 detected by the first magnetic sensor 72-1 linearly decreases. Similarly, when the movable body 10 moves in the positive direction of the Z axis, the second magnetic field strength B2 detected by the second magnetic sensor 72-2 linearly decreases. In addition, if the movable body 10 moves to a negative side of the Z axis, the distance between the first magnetic sensor 72-1 and the second portion 42 increases, so that the magnetic field component from the first portion 41 included in the magnetic field detected by the first magnetic sensor 72-1 increases, and the magnetic field component from the second portion 42 decreases. Therefore, as shown in FIG. 3, when the movable body 10 moves in a negative direction of the Z axis, the first magnetic field strength B1 detected by the first magnetic sensor 72-1 linearly increases. Similarly, when the movable body 10 moves in the negative direction of the Z axis, the second magnetic field strength B2 detected by the second magnetic sensor 72-2 linearly increases.

Figure 4:
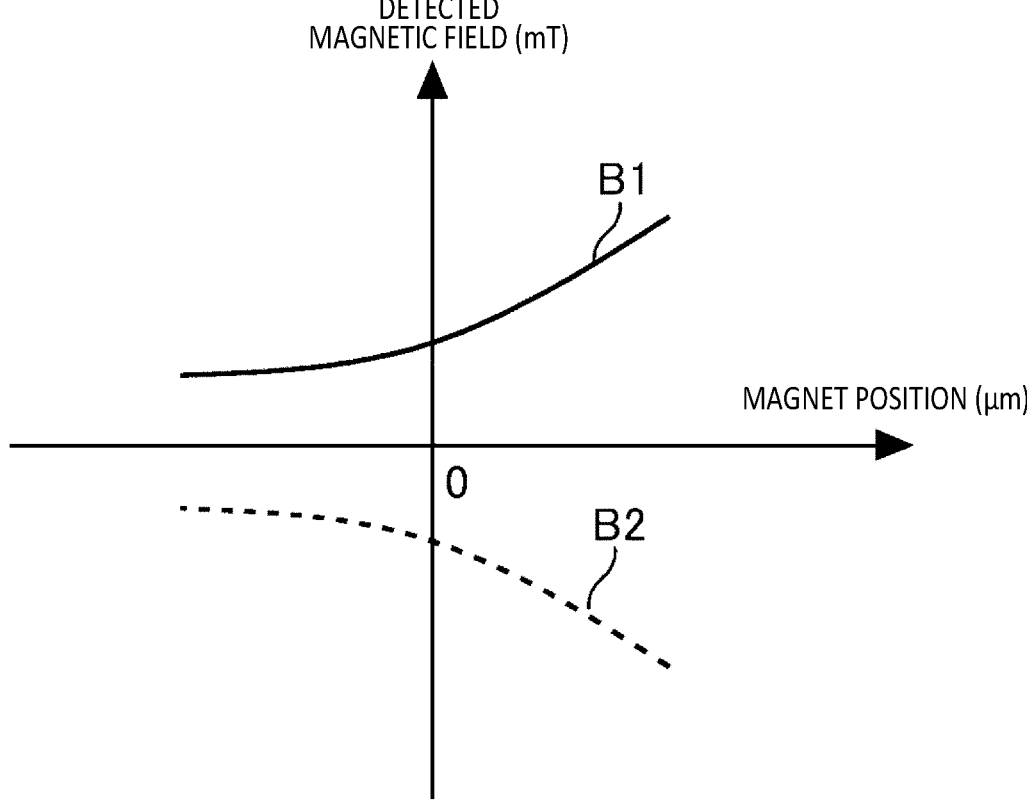
FIG. 4 shows relationships between a position of the movable body 10 in an X axis direction and strengths of magnetic fields detected by the first magnetic sensor 72-1 and the second magnetic sensor 72-2.

FIG. 4 shows relationships between a position of the movable body 10 in the X axis direction and strengths of magnetic fields detected by the first magnetic sensor 72-1 and the second magnetic sensor 72-2. In the initial state shown in FIG. 2, the first magnetic sensor 72-1 detects the first magnetic field strength B1 which is positive. The second magnetic sensor 72-2 detects the second magnetic field strength B2 which is negative.

When the movable body 10 moves in the X axis direction, a distance between each magnetic sensor 72 and the first magnet 32-1 changes. In FIG. 4, a direction in which the distance between the magnetic sensor 72 and the first magnet 32-1 decreases is referred to as a positive direction of the X axis, and a direction in which the distance increases is referred to as a negative direction of the X axis. An absolute value of the magnetic field strength detected by each magnetic sensor 72 attenuates in proportion to the square to the cube of the distance from the first magnet 32-1. A magnetosensitive axis of each magnetic sensor 72 is set to exhibit characteristics shown in FIG. 3 and FIG. 4.

The IC chip 70-1 detects a position of the movable body 10 in a first direction and a position of the movable body 10 in a second direction based on the first magnetic field strength B1 detected by the first magnetic sensor 72-1 and the second magnetic field strength B2 detected by the second magnetic sensor 72-2. The IC chip 70-1 may calculate the position of the movable body 10 in the second direction based on at least one of the first magnetic field strength B1 or the second magnetic field strength B2. The IC chip 70-1 may calculate the position of the movable body 10 in the first direction based on one of a sum of the first magnetic field strength B1 and the second magnetic field strength B2 and a difference between the first magnetic field strength B1 and the second magnetic field strength B2, and calculate the position of the movable body 10 in the second direction based on the other of the sum and the difference.

As shown in FIG. 3, B2+B1 decreases as the movable body 10 moves in a positive direction of the Z axis, and B2+B1 increases as the movable body 10 moves in a negative direction of the Z axis. The IC chip 70-1 may calculate a position of the movable body 10 in the Z axis direction based on the sum of the first magnetic field strength B1 and the second magnetic field strength B2. The IC chip 70-1 may calculate the position of the movable body 10 in the Z axis direction based on a value $(B2+B1)/(B2-B1)$ obtained by dividing the sum of the first magnetic field strength B1 and the second magnetic field strength B2 by the difference between the first magnetic field strength B1 and the second magnetic field strength B2.

As shown in FIG. 4, an absolute value of B2−B1 increases as the movable body 10 moves in the positive direction of the X axis, the absolute value of B2−B1 decreases as the movable body 10 moves in the negative direction of the X axis. The IC chip 70-1 may calculate the position of the movable body 10 in the X axis direction based on the difference between the first magnetic field strength B1 and the second magnetic field strength B2.

According to the present example, it is possible for one IC chip 70-1 to detect positions of the movable body 10 in two directions. Therefore, it is possible to reduce the number of parts of the camera module 100 or to reduce a size of the camera module 100, as compared to a case where the IC chip 70 is provided in each direction. In addition, the first magnet 32-1 included in the first drive unit 30-1 is also used as a magnet for position detection. Therefore, there is no need to separately provide the magnet for position detection, and it is possible to reduce the number of parts of the camera module 100 or to reduce the size of the camera module 100.

The magnetic sensor 72 of the IC chip 70-2 detects a magnetic field strength similar to B1 or B2 in FIG. 4. In this case, a magnet position represented by the horizontal axis in FIG. 4 refers to a position of the movable body 10 in the Y axis direction. The IC chip 70-2 may calculate the position of the movable body 10 in the Y axis direction based on a result of detection by the magnetic sensor 72. In another example, the camera module 100 may have only the magnetic sensor 72 without having the IC chip 70-2 on the third surface 16-3. The IC chip 70-1 may calculate the position of the movable body 10 in the Y axis direction based on the result of detection by the magnetic sensor 72 on the third surface 16-3.

Figure 5:
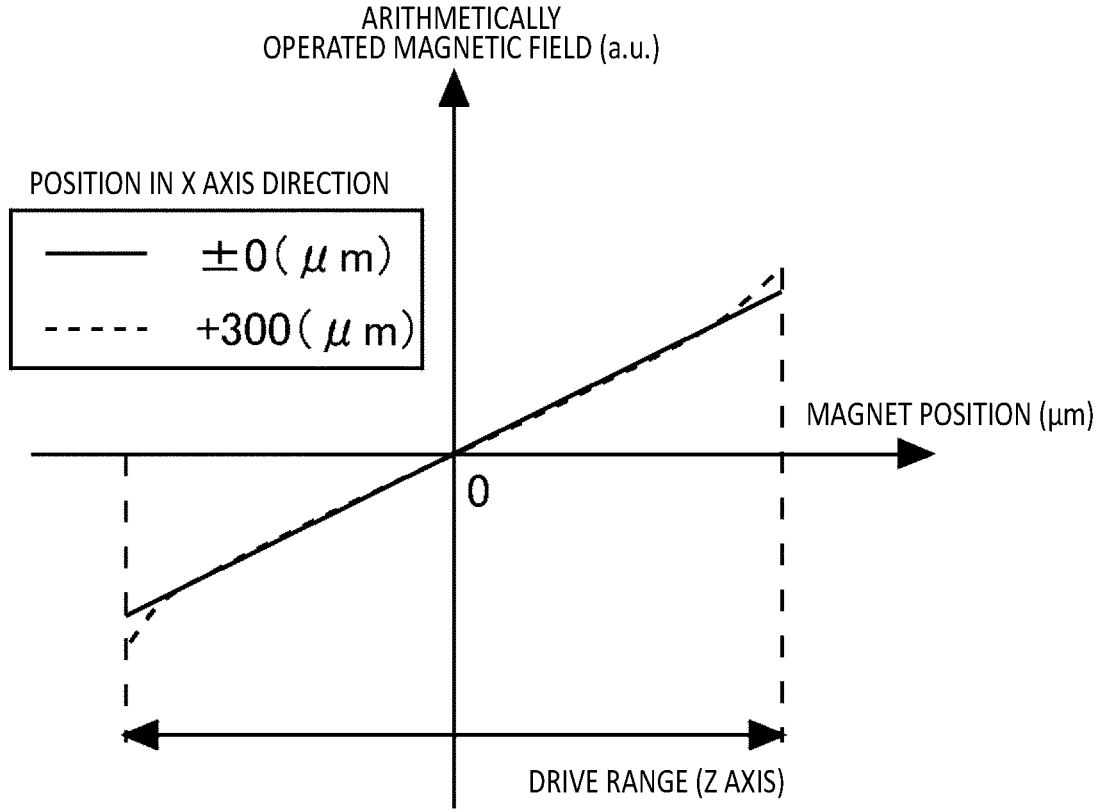
FIG. 5 illustrates an influence of a position of the movable body 10 in the X axis direction on a result of calculating a position of the movable body 10 in the Z axis direction.

FIG. 5 illustrates an influence of a position of the movable body 10 in the X axis direction on a result of calculating a position of the movable body 10 in the Z axis direction. The horizontal axis in FIG. 5 represents the position in the Z axis direction, and the vertical axis represents a value of a magnetic field after the arithmetic operation shown in FIG. 3 or FIG. 4 is performed in an arithmetic operation unit. In FIG. 5, the position of the movable body 10 in the Z axis direction is calculated based on a value (B2+B1)/(B2−B1) obtained by dividing the sum of the first magnetic field strength B1 and the second magnetic field strength B2 in FIG. 3 by the difference between the first magnetic field strength B1 and the second magnetic field strength B2. A drive range in the figure represents a range in which the IC chip 70 moves the movable body 10. In the present speci-fication, a range in which the movable body 10 is able to mechanically move may be referred to as a movable range. Even if a strength of a magnetic field generated by the magnetic field generation unit 34 is increased, the movable body 10 cannot move beyond a certain range due to a mechanical interference or the like. The certain range is referred to as the movable range. On the other hand, the drive range is a movement range of the movable body 10 previously set in the IC chip 70 or the like. The IC chip 70 controls the magnetic field generated by the magnetic field generation unit 34 such that the movable body 10 moves within the drive range. The IC chip 70 may detect the position of the movable body 10 or control the position of the movable body 10 by using a position code assigned to each position within the drive range. For example, a mini-mum value of the position code is assigned to one end portion position of the drive range, and a maximum value of the position code is assigned to the other end portion position of the drive range. The drive range may be a range narrower than the movable range. Calculating the position of the movable body 10 in the Z axis direction may mean collating previously obtained data shown in FIG. 5 with an arithmetically operated magnetic field calculated by the IC chip 70-1 and calculating a relative position of the movable body 10 with respect to the drive range. A solid line in the figure indicates a case where the position of the movable body 10 in the X axis direction is at an origin, and a dotted line in the figure indicates a case where the position of the movable body 10 in the X axis direction is at +300 μm.

Figure 6:
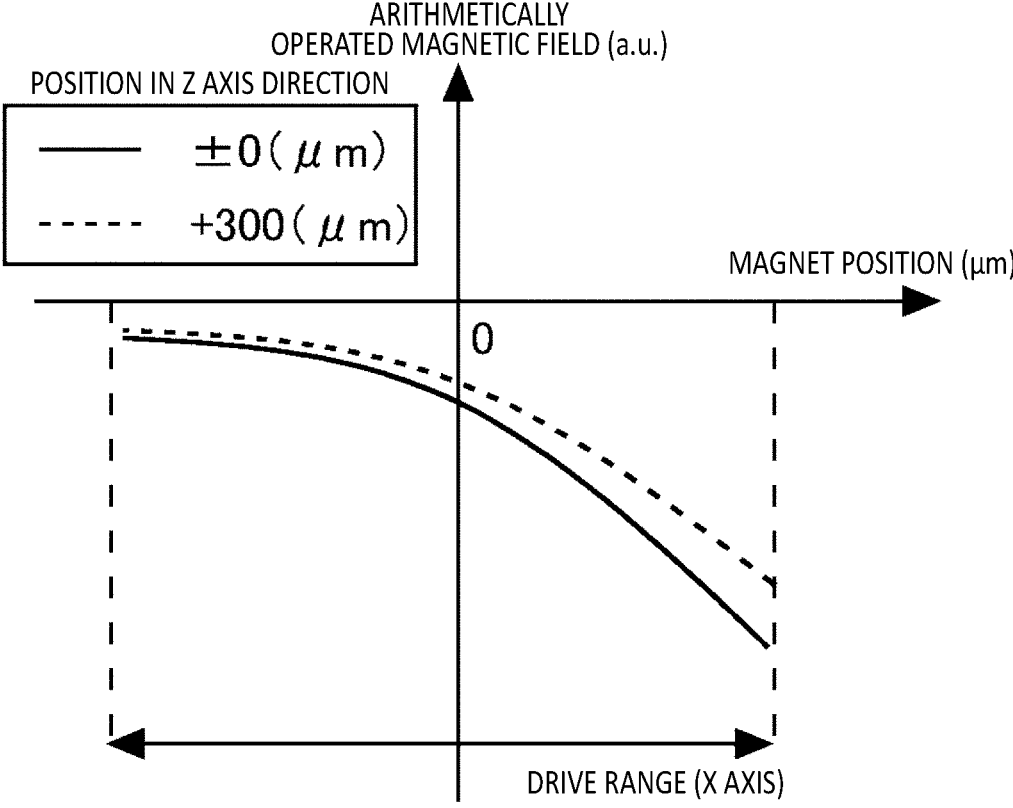
FIG. 6 illustrates an influence of a position of the movable body 10 in the Z axis direction on a result of calculating a position of the movable body 10 in the X axis direction.

FIG. 6 illustrates an influence of a position of the movable body 10 in the Z axis direction on a result of calculating a position of the movable body 10 in the X axis direction. The horizontal axis in FIG. 6 represents the position in the X axis direction, and the vertical axis represents a value of a magnetic field after the arithmetic operation shown in FIG. 3 or FIG. 4 is performed in an arithmetic operation unit. In FIG. 6, the position of the movable body 10 in the X axis direction is calculated based on the difference between the first magnetic field strength B1 and the second magnetic field strength B2 in FIG. 4. A solid line in the figure indicates a case where the position of the movable body 10 in the Z axis direction is at an origin, and a dotted line in the figure indicates a case where the position of the movable body 10 in the Z axis direction is at +300 μm.

As shown in FIG. 5 and FIG. 6, when the IC chip 70-1 calculates the position of the movable body 10 in the X axis or Z axis direction, the calculation result is affected by the position of the movable body 10 on another axis. FIG. 5 shows an example in which an actual position of the movable body 10 in the X axis direction affects a detection position of the movable body 10 in the Z axis direction. Similarly, an actual position of the movable body 10 in the Y axis direction may affect the detection position of the movable body 10 in the Z axis direction. In addition, FIG. 6 shows an example in which an actual position of the movable body 10 in the Z axis direction affects a detection position of the movable body 10 in the X axis direction. Similarly, the actual position of the movable body 10 in the Y axis direction may affect the detection position of the movable body 10 in the X axis direction. In addition, the actual position of the movable body 10 in the X axis direction or the Z axis direction may affect a detection position of the movable body 10 in the Y axis direction. In this manner, the detection position of the movable body 10 on another axis varies depending on the actual position of the movable body 10 on each axis. Therefore, an error is generated in a result of detecting the position of the movable body 10. In addition, it may be erroneously detected that the movable body 10 has moved to an end of a drive range even though it has not actually moved to the end of the drive range, which may restrict further movement of the movable body 10. In this case, the movable body 10 no longer moves to the end of the drive range, and an actual drive range of the movable body 10 becomes narrow. In addition, it may be erroneously detected that the movable body 10 is still located within the drive range even though the movable body 10 has actually moved to the end of the movable range, which may result in an attempt to move the movable body 10 further. In this case, even if the attempt is made to move the movable body 10, the movable body 10 no longer moves. Therefore, it is desirable that the IC chip 70-1 corrects a relative position based on the position of the movable body 10 on another axis.

Figure 7:
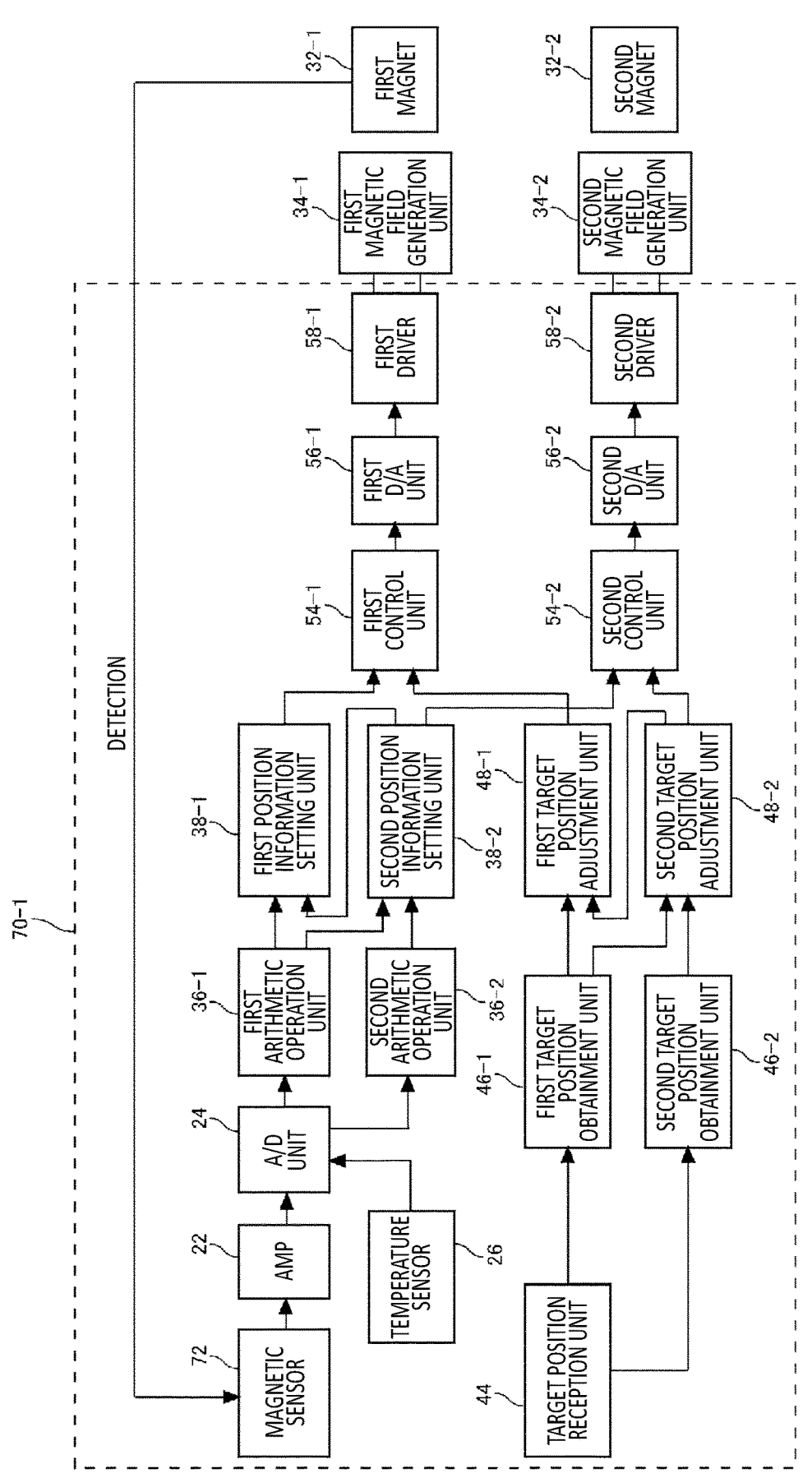
FIG. 7 shows an exemplary configuration of the IC chip 70-1.

FIG. 7 shows an exemplary configuration of the IC chip 70-1. The IC chip 70-1 in the present example has the magnetic sensor 72, an AMP 22, an A/D unit 24, a tempera-ture sensor 26, a first arithmetic operation unit 36-1, a second arithmetic operation unit 36-2, a first position infor-mation setting unit 38-1, a second position information setting unit 38-2, a target position reception unit 44, a first target position obtainment unit 46-1, a second target position obtainment unit 46-2, a first target position adjustment unit 48-1, a second target position adjustment unit 48-2, a first control unit 54-1, a second control unit 54-2, a first D/A unit 56-1, a second D/A unit 56-2, a first driver 58-1, and a second driver 58-2. The magnetic sensor 72 outputs a signal according to a detected magnetic field strength to the AMP 22. The AMP 22 amplifies the signal from the magnetic sensor 72, to output it to the A/D unit 24. The A/D unit 24 converts the signal amplified by the AMP 22 into a digital signal, and outputs it to the first arithmetic operation unit 36-1 and the second arithmetic operation unit 36-2. A value of the digital signal indicates the detected magnetic field strength. The temperature sensor 26 detects temperature inside the IC chip 70-1. In addition, the IC chip 70-1 may compensate for a temperature characteristic of an internal circuit by using an output of the temperature sensor 26. The first arithmetic operation unit 36-1 and the second arithmetic operation unit 36-2 calculate a sum signal of or a difference signal between the first magnetic field strength B1 and the second magnetic field strength B2, described in FIGS. 3 to 6. The first arithmetic operation unit 36-1 may calculate a position of the movable body 10 in a first direction based on at least one of a sum of, a difference between, or the sum of/the difference between, the first magnetic field strength and the second magnetic field strength, and the second arithmetic operation unit 36-2 may calculate a position of the movable body 10 in a second direction based on at least one of the sum of or the difference between the first magnetic field strength and the second magnetic field strength. For example, the first arithmetic operation unit 36-1 calculates the sum signal of the first magnetic field strength B1 and the second magnetic field strength B2, and the second arithmetic operation unit 36-2 calculates the difference signal between the first magnetic field strength B1 and the second magnetic field strength B2.

The first position information setting unit 38-1 calculates a first relative position of the movable body 10 with respect to a first drive range in the first direction in accordance with magnetic fields detected by the plurality of magnetic sensors 72. Similarly, the second position information setting unit 38-2 calculates a second relative position of the movable body 10 with respect to a second drive range in the second direction in accordance with the magnetic fields detected by the plurality of magnetic sensors 72. The first position information setting unit 38-1 may previously set information on an end point of the first drive range in the first direction. Setting of end point information may be indicated by the position code described above. The first position information setting unit 38-1 may convert a result in the first arithmetic operation unit 36-1 into the position code, and calculate the first relative position of the movable body 10 with respect to the first drive range based on the end point information. The second position information setting unit 38-2 may previously set information at an end point of the second drive range in the second direction. Setting of end point information may be indicated by a position code in an IC. The second position information setting unit 38-2 may convert a result in the second arithmetic operation unit 36-2 into the position code in the IC, and calculate the second relative position of the movable body 10 with respect to the second drive range based on the end point information.

The first position information setting unit 38-1 and the second position information setting unit 38-2 may update the first drive range and the second drive range. The second position information setting unit 38-2 may update the end point information of the second drive range in the second direction in accordance with the result in the first arithmetic operation unit 36-1. The first position information setting unit 38-1 may update the end point information of the first drive range in the first direction based on the second relative position calculated by using the end point information updated in the second position information setting unit 38-2. The first position information setting unit 38-1 may sequentially calculate the first relative position based on the second relative position of the movable body 10 in the second direction. Sequentially calculating the first relative position may mean calculating the first relative position each time the second relative position is updated. The first position information setting unit 38-1 and the second position information setting unit 38-2 may correct an output result from the arithmetic operation unit 36 by setting and updating the end point information without directly correcting the output result from the arithmetic operation unit 36. In the present specification, reference to correction may include calculation and updating. A specific method of correction will be described later.

The IC chip 70-1 has the target position reception unit 44. The target position reception unit 44 receives a first target position in the first direction and a second target position in the second direction of the movable body 10 from an outside. Each target position may be set based on an operation by a user of the camera module 100, or may be set based on an arithmetic operation result for realizing an auto-focusing function, an image stabilization function, or the like. The first target position obtainment unit 46-1 obtains the first target position from the target position reception unit 44. The second target position obtainment unit 46-2 obtains the second target position from the target position reception unit 44. The first target position adjustment unit 48-1 calculates the first target position in the first drive range. The second target position adjustment unit 48-2 calculates the second target position in the second drive range. The first position information setting unit 38-1 and the first target position adjustment unit 48-1 may correct at least one of the first relative position or the first target position based on at least one of the second relative position or the second target position. The first target position adjustment unit 48-1 may correct the first target position in the first drive range in accordance with the second target position corrected in the second target position adjustment unit 48-2. The second position information setting unit 38-2 and the second target position adjustment unit 48-2 may correct at least one of the second relative position or the second target position based on at least one of the first relative position or the first target position, as described later in FIG. 12. The second target position adjustment unit 48-2 may correct the second target position in the second drive range in accordance with the first target position corrected in the first target position adjustment unit 48-1. Specific methods of calculation and correction will be described later.

The first control unit 54-1 obtains the first relative position and the first target position in the first drive range from the first position information setting unit 38-1 and the first target position adjustment unit 48-1. The first control unit 54-1 outputs a signal for controlling the first magnetic field generation unit 34-1 based on the first relative position and the first target position. The first control unit 54-1 may output a signal based on a difference between the first relative position and the first target position. For example, the first control unit 54-1 outputs a signal for moving the movable body 10 by a distance according to the difference in a direction in which the difference decreases. The signal is converted into an analog signal in the first D/A unit 56-1, and is outputted to the first driver 58-1. The first driver 58-1 drives the movable body 10 in the first direction based on the signal inputted from the first D/A unit 56-1 in accordance with the first relative position of the movable body 10 in the first direction The first driver 58-1 drives the movable body 10 by changing a magnetic field generated for the first magnet 32-1 in the first magnetic field generation unit 34-1 based on the signal.

Similarly, the second control unit 54-2 obtains the second relative position and the second target position in the second drive range from the second position information setting unit 38-2 and the second target position adjustment unit 48-2. The second control unit 54-2 outputs a signal for controlling the second magnetic field generation unit 34-2 based on the second relative position and the second target position. The second control unit 54-2 may output a signal based on a difference between the second relative position and the second target position. The signal is converted into an analog signal in the second D/A unit 56-2, and is outputted to the second driver 58-2. The second driver 58-2 drives the movable body 10 in the second direction based on the second relative position of the movable body 10 in the second direction. The second driver 58-2 changes a magnetic field generated for the second magnet 32-2 in the second magnetic field generation unit 34-2 based on the signal. The IC chip 70-1 in the present example calculates and corrects positions of the movable body 10 in the Z axis direction as the first direction and in the X axis direction as the second direction, but the first direction and the second direction are not limited to this.

Figure 8:
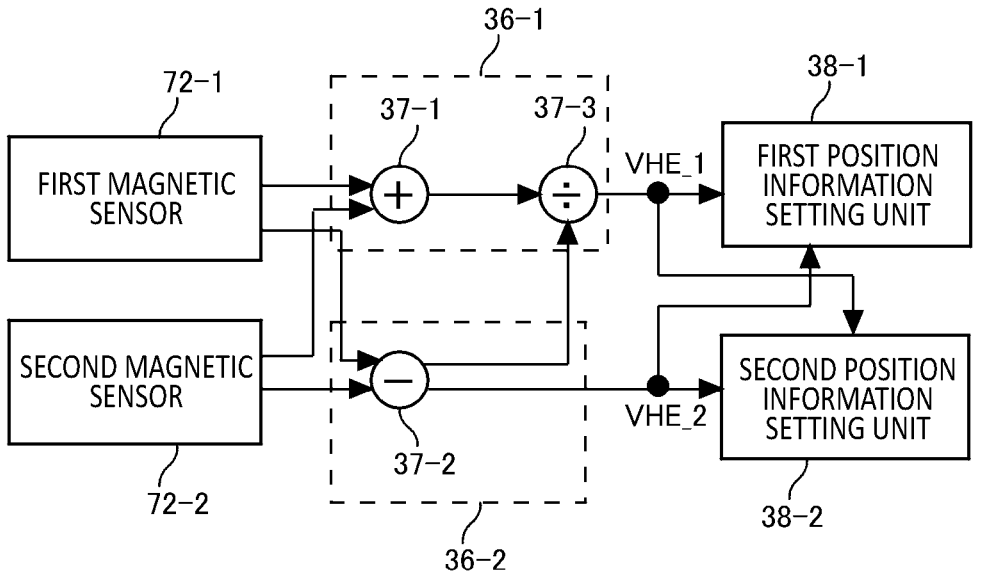
FIG. 8 shows exemplary configurations of a first arithmetic operation unit 36-1 and a second arithmetic operation unit 36-2.

FIG. 8 shows exemplary configurations of the first arithmetic operation unit 36-1 and the second arithmetic operation unit 36-2. The first arithmetic operation unit 36-1 has an adding circuit 37-1 and a dividing circuit 37-3. The second arithmetic operation unit 36-2 has a subtracting circuit 37-2. In the present example, the first arithmetic operation unit 36-1 calculates a position of the movable body 10 in a first direction based on a sum of/a difference between, the first magnetic field strength and the second magnetic field strength. In the present example, the second arithmetic operation unit 36-2 calculates a position of the movable body 10 in a second direction based on the difference between the first magnetic field strength and the second magnetic field strength. In the present example, the IC chip 70-1 has the first magnetic sensor 72-1 and the second magnetic sensor 72-2. It should be noted that illustration of the AMP 22, the A/D unit 24, and the temperature sensor 26 is omitted in FIG. 8.

The first magnetic sensor 72-1 outputs a signal according to the first magnetic field strength to the adding circuit 37-1 and the subtracting circuit 37-2. Similarly, the second magnetic sensor 72-2 outputs a signal according to the second magnetic field strength to the adding circuit 37-1 and the subtracting circuit 37-2. The adding circuit 37-1 takes the sum of the first magnetic field strength and the second magnetic field strength, and outputs a sum signal to the dividing circuit 37-3. The subtracting circuit 37-2 takes the difference between the first magnetic field strength and the second magnetic field strength, and outputs a difference signal to the dividing circuit 37-3 and the second position information setting unit 38-2. The difference signal branches at a branch point VHE_2, and is outputted to the first position information setting unit 38-1 as well. The dividing circuit 37-3 divides the sum signal by the difference signal, and outputs the divided signal to the first position information setting unit 38-1. The divided signal branches at a branch point VHE_1, and is outputted to the second position information setting unit 38-2 as well.

Figure 9:
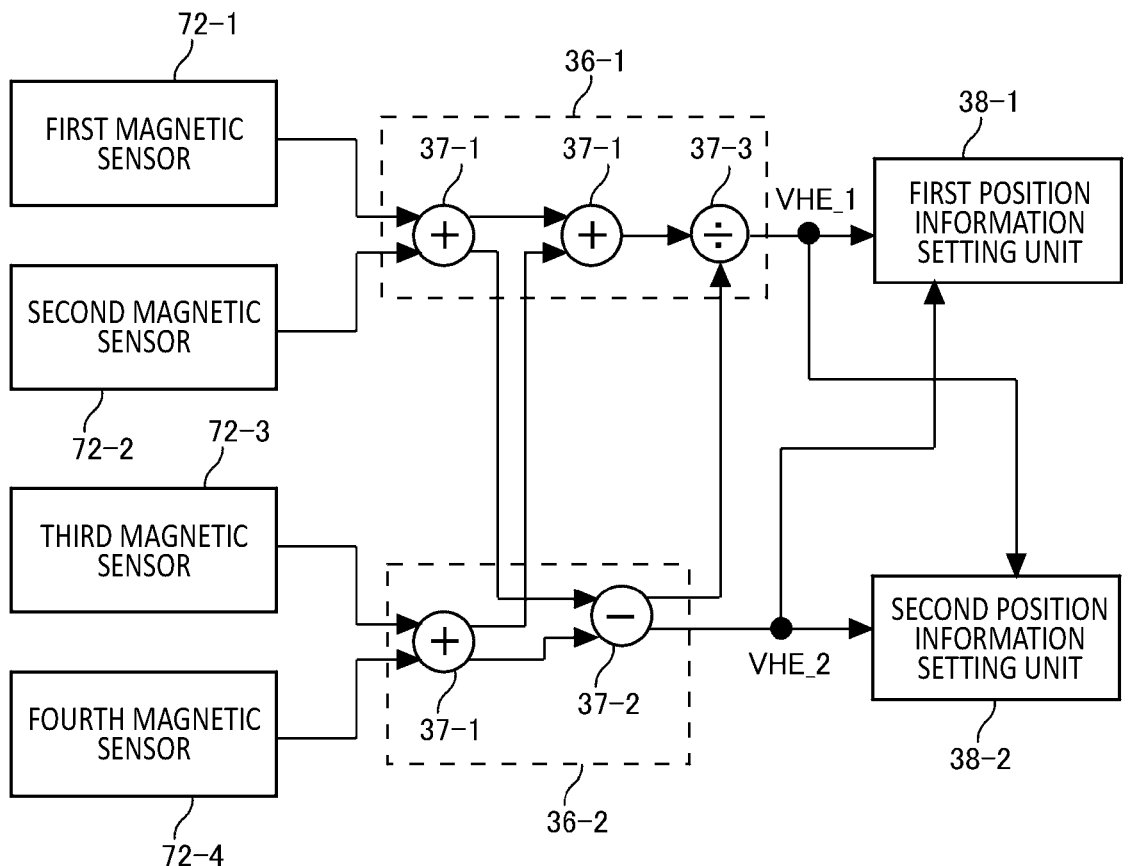
FIG. 9 shows other exemplary configurations of the first arithmetic operation unit 36-1 and the second arithmetic operation unit 36-2.

FIG. 9 shows other exemplary configurations of the first arithmetic operation unit 36-1 and the second arithmetic operation unit 36-2. The first arithmetic operation unit 36-1 in the present example has two adding circuits 37-1 and a dividing circuit 37-3. The second arithmetic operation unit 36-2 in the present example has the adding circuit 37-1 and the subtracting circuit 37-2. In the present example, the IC chip 70-1 has the first magnetic sensor 72-1, the second magnetic sensor 72-2, a third magnetic sensor 72-3, and a fourth magnetic sensor 72-4. It should be noted that the illustration of the AMP 22, the A/D unit 24, and the temperature sensor 26 is omitted in FIG. 9 as well.

The first magnetic sensor 72-1 outputs a signal according to a first magnetic field strength to a first adding circuit 37-1 of the first arithmetic operation unit 36-1. Similarly, the second magnetic sensor 72-2 outputs a signal according to a second magnetic field strength to the first adding circuit 37-1 of the first arithmetic operation unit 36-1. The third magnetic sensor 72-3 outputs a signal according to a third magnetic field strength detected by the third magnetic sensor 72-3 to the adding circuit 37-1 of the second arithmetic operation unit 36-2. The fourth magnetic sensor 72-4 outputs a signal according to a fourth magnetic field strength detected by the fourth magnetic sensor 72-4 to the adding circuit 37-1 of the second arithmetic operation unit 36-2.

The first adding circuit 37-1 of the first arithmetic operation unit 36-1 takes a sum of the first magnetic field strength and the second magnetic field strength, and outputs a sum signal to a second adding circuit 37-1 of the first arithmetic operation unit 36-1 and the subtracting circuit 37-2 of the second arithmetic operation unit 36-2. The adding circuit 37-1 of the second arithmetic operation unit 36-2 takes a sum of the third magnetic field strength and the fourth magnetic field strength, and outputs a sum signal to the second adding circuit 37-1 of the first arithmetic operation unit 36-1 and the subtracting circuit 37-2 of the second arithmetic operation unit 36-2.

The second adding circuit 37-1 of the first arithmetic operation unit 36-1 takes a sum of the sum signal outputted from the first adding circuit 37-1 of the first arithmetic operation unit 36-1 and the sum signal outputted from the adding circuit 37-1 of the second arithmetic operation unit 36-2, and outputs a sum signal to the dividing circuit 37-3 of the first arithmetic operation unit 36-1. The subtracting circuit 37-2 of the second arithmetic operation unit 36-2 takes a difference between the sum signal outputted from the first adding circuit 37-1 of the first arithmetic operation unit 36-1 and the sum signal outputted from the adding circuit 37-1 of the second arithmetic operation unit 36-2, and outputs a difference signal to the dividing circuit 37-3 of the first arithmetic operation unit 36-1 and the second position information setting unit 38-2. The difference signal branches at the branch point VHE_2, and is outputted to the first position information setting unit 38-1 as well.

The dividing circuit 37-3 of the first arithmetic operation unit 36-1 divides the sum signal from the second adding circuit 37-1 of the first arithmetic operation unit 36-1 by the difference signal from the subtracting circuit 37-2 of the second arithmetic operation unit 36-2, and outputs the divided signal to the first position information setting unit 38-1. The divided signal branches at the branch point VHE_1, and is outputted to the second position information setting unit 38-2 as well.

Similar processing may be performed even if there are four or more magnetic sensors 72. The number of magnetic sensors 72 may be an odd number. For example, if there are three magnetic sensors 72, the second arithmetic operation unit 36-2 does not need to have the adding circuit 37-1.

Figure 10:
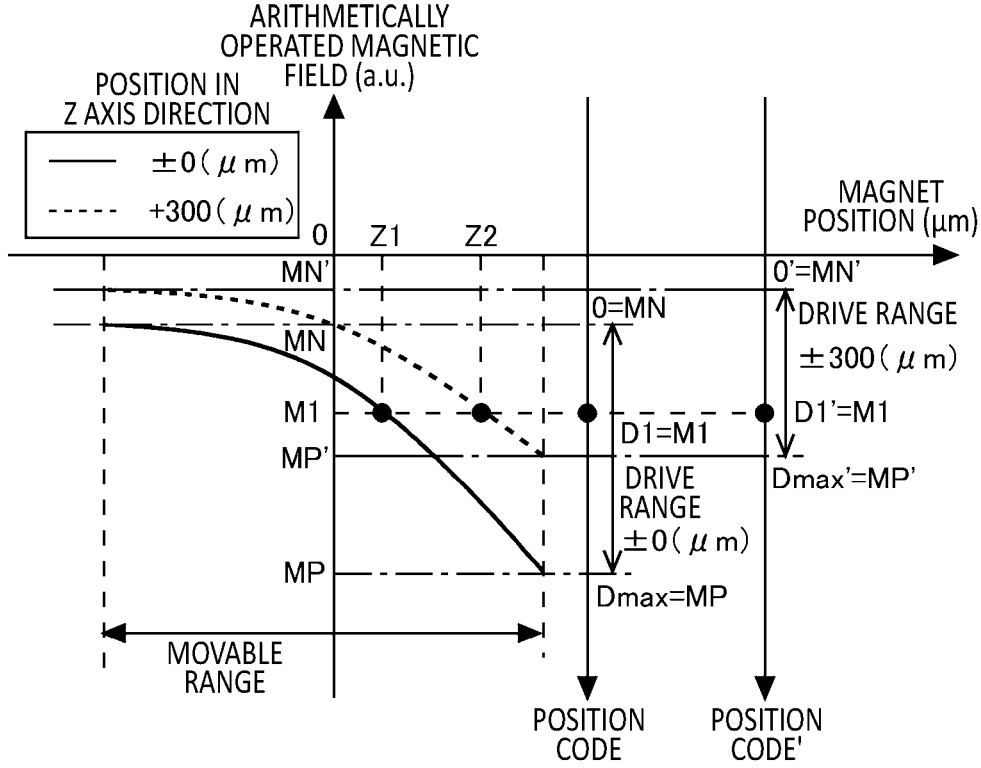
FIG. 10 illustrates correction for an influence of a position on another axis.

FIG. 10 illustrates correction for an influence of a position on another axis. FIG. 10 corrects the influence of the position of the movable body 10 in the Z axis direction on the position in the X axis direction for a case of FIG. 6. Description duplicated with the description in FIG. 6 will be omitted. In addition, for illustrative purpose, the influence of the position on another axis is illustrated in an exaggerated manner. In FIG. 10, an arithmetic operation result of a magnetic field in the arithmetic operation unit 36 is referred to as M1. If M1 is collated with data for a case where the position in the Z axis direction is at an origin (a solid line in the figure), the position of the movable body 10 in the X axis direction is calculated as Z1. If the position of the movable body 10 in the Z axis direction is at the origin, there is no problem because a correct position has been calculated. However, for example, if the position in the Z axis direction is at +300 μm, data representing a relationship between the position of the movable body 10 in the X axis direction and an arithmetically operated magnetic field is as indicated by a dotted line in the figure, and is deviated from data for a case where the position of the movable body 10 in the X axis direction is at the origin. In this manner, if the position of the movable body 10 in the X axis direction is calculated by using the data for a case where the position in the Z axis direction is at the origin (the solid line in FIG. 10) when the position in the Z axis direction is not at the origin, the position in the X axis direction, which is actually Z2, is calculated as Z1, for example.

In order to correct an error due to this position on another axis, the first position information setting unit 38-1 and the second position information setting unit 38-2 may hold the data representing the relationship between the position in the X axis direction and the arithmetically operated magnetic field for each position on another axis, and select the data to be referenced in accordance with an actual position of the movable body 10 on another axis.

As another example, the first position information setting unit 38-1 and the second position information setting unit 38-2 perform correction by adjusting a position of an end point of a drive range. The first position information setting unit 38-1 and the second position information setting unit 38-2 may set the drive range, and calculate a position of the movable body 10 as a relative position with respect to the drive range. The relative position with respect to the drive range refers to a position within the drive range. The relative position with respect to the drive range may mean, for example, a distance between at least one of a lower limit position or an upper limit position of the drive range and the position of the movable body 10, or may mean a ratio of the distance to a length of the drive range. At this time, the position of the movable body 10 may be indicated by using a position code assigned to each position within the drive range.

In FIG. 10, coordinate axes for a case where the position of the movable body 10 in the Z axis direction is at an origin are referred to as a "position code", and coordinate axes for a case where the position of the movable body 10 in the Z axis direction is at +300 μm are referred to as a "position code'". In the present example, a lower limit of the drive range in the "position code" is defined as a value corresponding to an arithmetically operated magnetic field MN at a lower limit of a movable range for a case where the position of the movable body 10 in the Z axis direction is at the origin, and an upper limit of the drive range in the "position code" is defined as a value corresponding to an arithmetically operated magnetic field MP at un upper limit of the movable range for a case where the position of the movable body 10 in the Z axis direction is at the origin. Similarly, the lower limit of the drive range in the "position code'" is defined as a value corresponding to an arithmetically operated magnetic field MN' at the lower limit of the movable range for a case where the position of the movable body 10 in the Z axis direction is +300 μm, and the upper limit of the drive range in the "position code'" is defined as a value corresponding to an arithmetically operated magnetic field MP' at the upper limit of the movable range for a case where the position of the movable body 10 in the Z axis direction is at +300 μm. A position D1 in the "position code" in the figure corresponds to an arithmetically operated magnetic field M1 for a case where the position of the movable body 10 in the Z axis direction is at the origin, and a position D1' in the "position code'" corresponds the arithmetically operated magnetic field M1 for a case where the position of the movable body 10 in the Z axis direction is at +300 μm. In the present correction method, the influence of the position on another axis is corrected by adjusting end point information of the drive range and calculating a relative position of the arithmetically operated magnetic field in the drive range without directly correcting a value of the arithmetically operated magnetic field.

Similarly, calculation and correction of a target position may be performed by updating the end point of the drive range. First, the target position may be calculated by converting the received target position into the target position in the drive range by using the position code assigned to each position within the drive range in the figure. Next, the correction may be performed by updating the end point of the drive range in accordance with the position of the movable body 10 on another axis if the target position in the drive range is calculated from the received target position.

Figure 11:
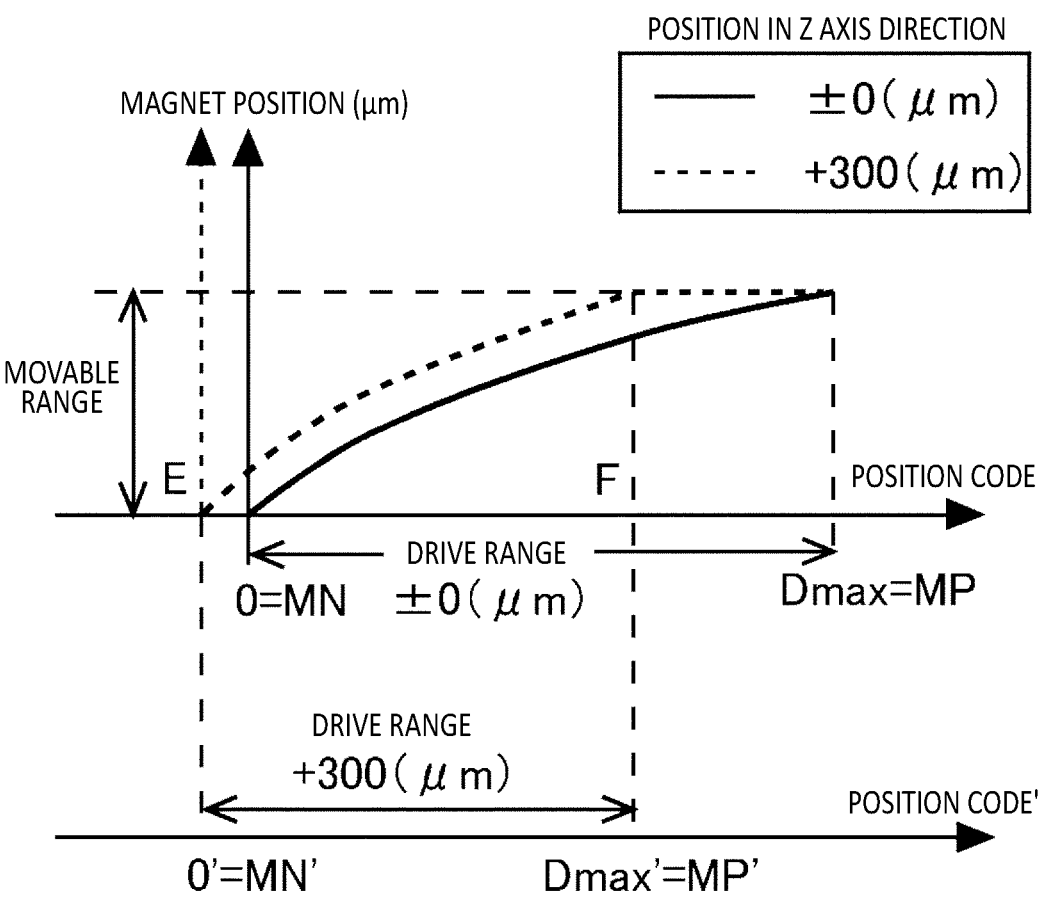
FIG. 11 illustrates an example of calculation and correction of a target position for an influence of a position on another axis.

FIG. 11 illustrates an example of calculation and correction of a target position for an influence of a position on another axis. The horizontal axis in FIG. 11 represents a position code, and the vertical axis represents a position of the movable body 10 in the X axis direction. A solid line in the figure indicates a case where a position of the movable body 10 in the Z axis direction is at an origin, and a dotted line indicates a case where the position of the movable body 10 in the Z axis direction is at +300 μm. FIG. 11 shows a case where the IC chip 70-1 controls the position of the movable body 10. Description of terms or symbols similar to those in FIG. 10 will be omitted. Similarly to FIG. 10, a curve for a case where the position in the Z axis direction is at +300 μm is shifted as compared to a curve for a case where the position in the Z axis direction is at the origin, and when the position code becomes equal to or greater than a certain value (a point F in the figure), the position of the movable body 10 becomes saturated, and then shows a constant value. Therefore, unless end point information of a drive range is updated for each position on another axis, a problem arises that the movable body 10 is not driven to an end at a position code 0. In addition, a problem arises that the movable body 10 is not driven any further in a range where the position code is great (equal to or greater than the point F in the figure).

In order to correct the influence of this position on another axis, the first position information setting unit 38-1 and the second position information setting unit 38-2 may adjust an end point of the drive range. An adjustment method may be similar to the method described in FIG. 10. In FIG. 11, the dotted line is extended to a negative region on the horizontal axis "position code", a point where the dotted line intersects the horizontal axis is referred to as E, and the point E is set as a lower limit of the end point of the drive range for a case where the position of the movable body 10 in the Z axis direction is at +300 μm. In addition, a point F where the dotted line starts to show the constant value is set as an upper limit of the end point of the drive range for a case where the position of the movable body 10 in the Z axis direction is at +300 μm. The first position information setting unit 38-1 and the second position information setting unit 38-2 calculate and correct the target position by converting the received target position into a relative position in the drive range according to the position on another axis described above.

Figure 12:
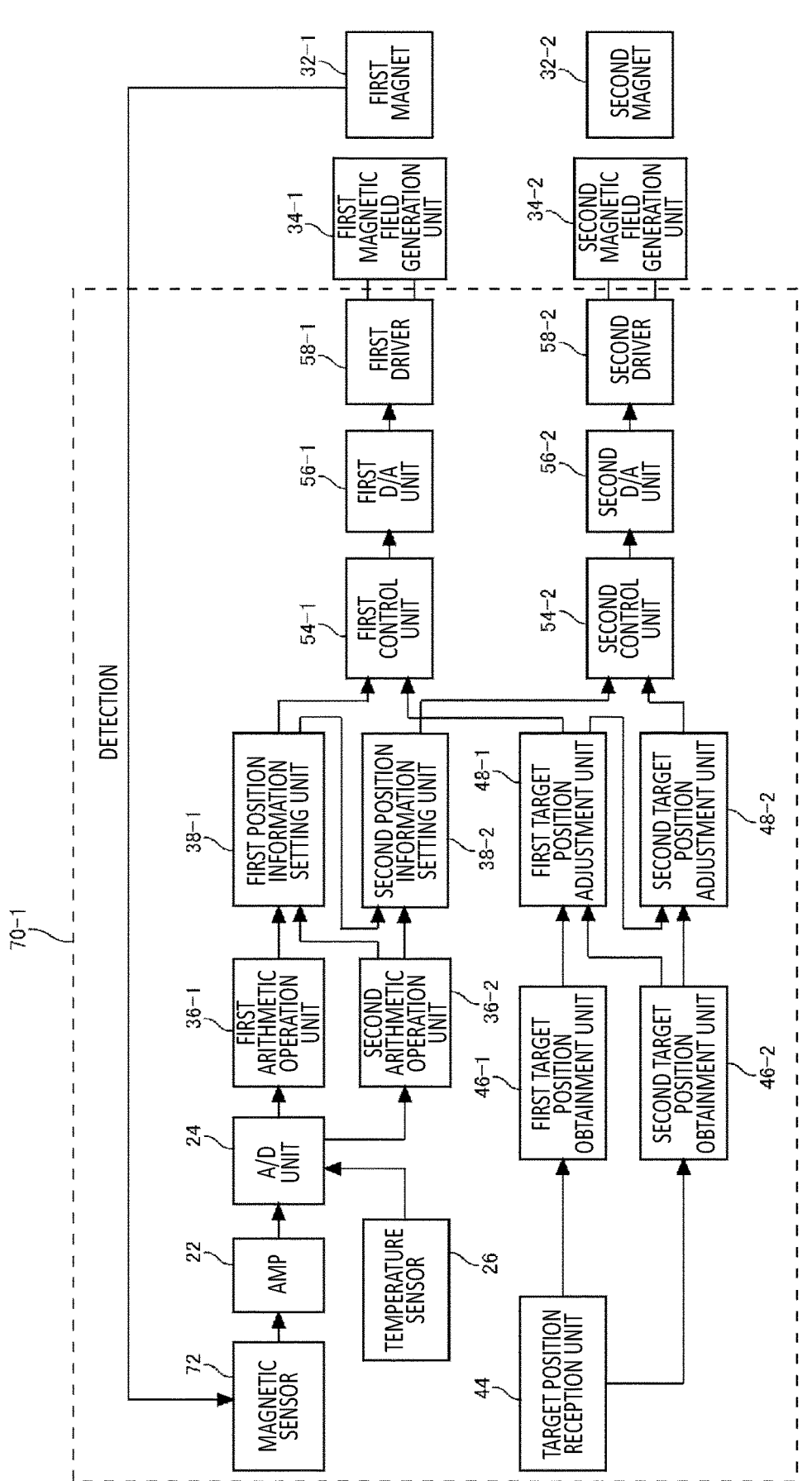
FIG. 12 shows another exemplary configuration of the IC chip 70-1.

FIG. 12 shows another exemplary configuration of the IC chip 70-1. In the IC chip 70-1 in FIG. 12, a first position information arithmetic operation unit obtains second position information outputted from the second arithmetic operation unit 36-2, and outputs a first relative position corrected in the first position information arithmetic operation unit to the second position information setting unit 38-2. In addition, the first target position adjustment unit 48-1 obtains a second target position outputted from the second target position obtainment unit 46-2, and outputs a first target position corrected in the first target position adjustment unit 48-1 to the second target position adjustment unit 48-2. Other than this point, it has a configuration similar to that of the IC chip 70-1 in FIG. 7, so description thereof will be omitted. In the present example, the second position information setting unit 38-2 and the second target position adjustment unit 48-2 may correct at least one of a second relative position or the second target position based on at least one of the first relative position or the first target position. The second position information setting unit 38-2 may correct the second relative position based on the first relative position of the movable body 10 with respect to a first drive range in a first direction. The second target position adjustment unit 48-2 may correct the second target position in a second drive range based on the first target position in the first drive range corrected in the first target position adjustment unit 48-1. A specific method of correction is similar to the methods described in FIG. 10 and FIG. 11.

Figure 13:
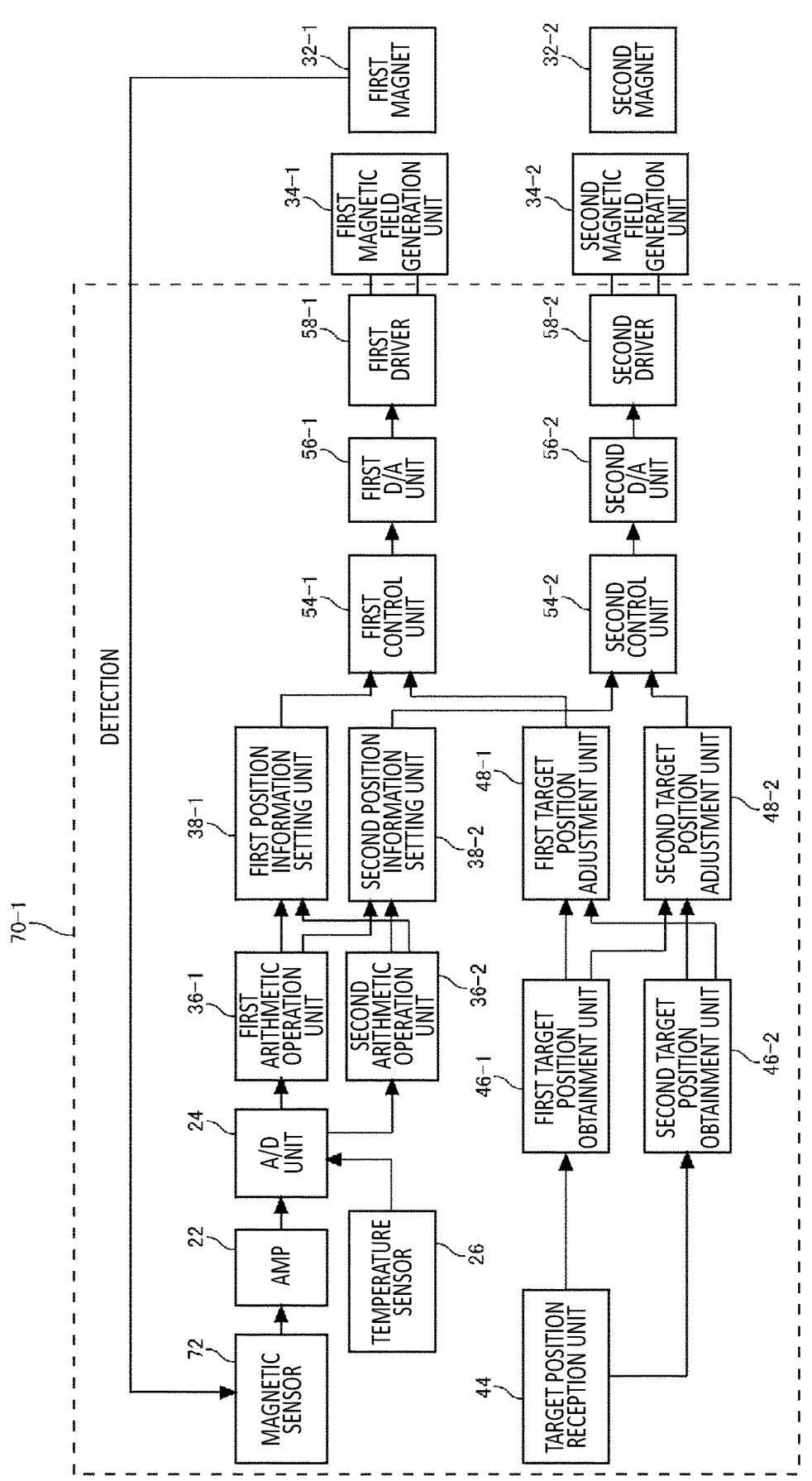
FIG. 13 shows another exemplary configuration of the IC chip 70-1.

FIG. 13 shows another exemplary configuration of the IC chip 70-1. In the IC chip 70-1 in FIG. 13, the first position information setting unit 38-1 obtains second position information from the second arithmetic operation unit 36-2, and the second position information setting unit 38-2 obtains first position information from the first arithmetic operation unit 36-1. In addition, the first target position adjustment unit 48-1 obtains the second position information from the second target position obtainment unit 46-2, and the second target position adjustment unit 48-2 obtains the first position information from the first target position obtainment unit 46-1. The first position information setting unit 38-1 may update end point information of a first drive range in a first direction in accordance with a result in the second arithmetic operation unit 36-2. The first position information setting unit 38-1 may correct a first relative position with respect to the first drive range in accordance with the result in the second arithmetic operation unit 36-2. The second position information setting unit 38-2 may update end point information of a second drive range in a second direction in accordance with a result in the first arithmetic operation unit 36-1. The second position information setting unit 38-2 may correct a second relative position with respect to the second drive range in accordance with the result in the first arithmetic operation unit 36-1. The first target position adjustment unit 48-1 may correct a first target position in the first drive range in accordance with a second target position. The second target position adjustment unit 48-2 may correct the second target position in the second drive range in accordance with the first target position. A specific method of correction is similar to the methods described in FIG. 10 and FIG. 11.

Figure 14:
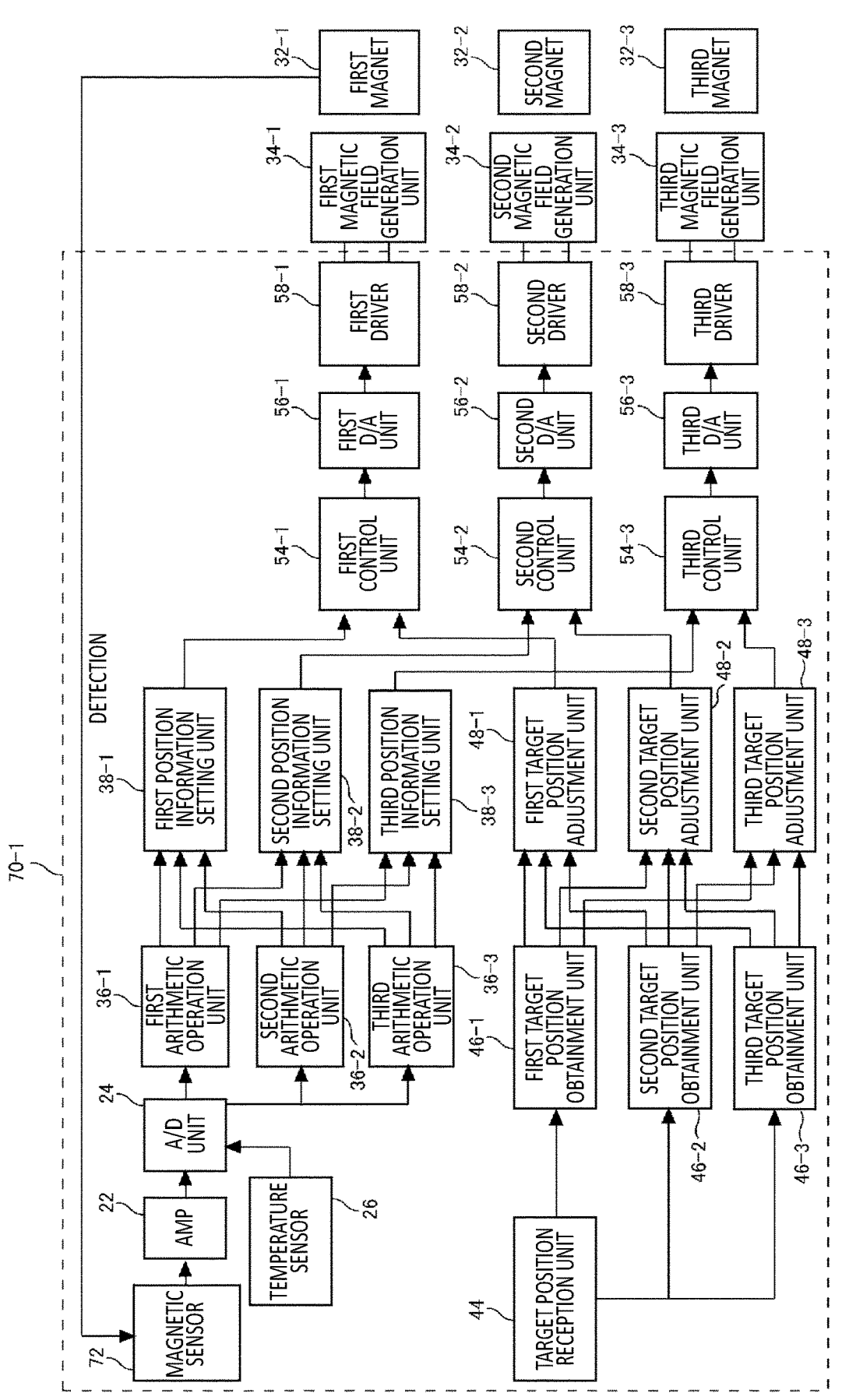
FIG. 14 shows another exemplary configuration of the IC chip 70-1.

FIG. 14 shows another exemplary configuration of the IC chip 70-1. The IC chip 70-1 in FIG. 14 has a third arithmetic operation unit 36-3, a third position information setting unit 38-3, a third target position obtainment unit 46-3, a third target position adjustment unit 48-3, a third control unit 54-3, a third D/A unit 56-3, and a third driver 58-3 in addition to any one of the configurations shown in FIGS. 7, 12, and 13. In addition, the camera module 100 has a third magnetic field generation unit and the third magnet 32-3.

The IC chip 70-1 in the present example is configured to detect a position of the movable body in a third direction in addition to a first direction and a second direction. The third direction may be the Y axis direction. The first magnet 32-1 may have a third portion adjacent to the first portion 41 or to the second portion 42 in the third direction. The IC chip 70-1 may have a third magnetic sensor. The third magnetic sensor may be arranged side by side with a first magnetic sensor or a second magnetic sensor in the third direction. As in the first direction, the IC chip 70-1 may detect a position of the movable body 10 in the third direction based on a sum of or the sum of/a difference between, a first magnetic field strength or a second magnetic field strength and a third magnetic field strength which is detected by the third magnetic sensor.

Figure 15:
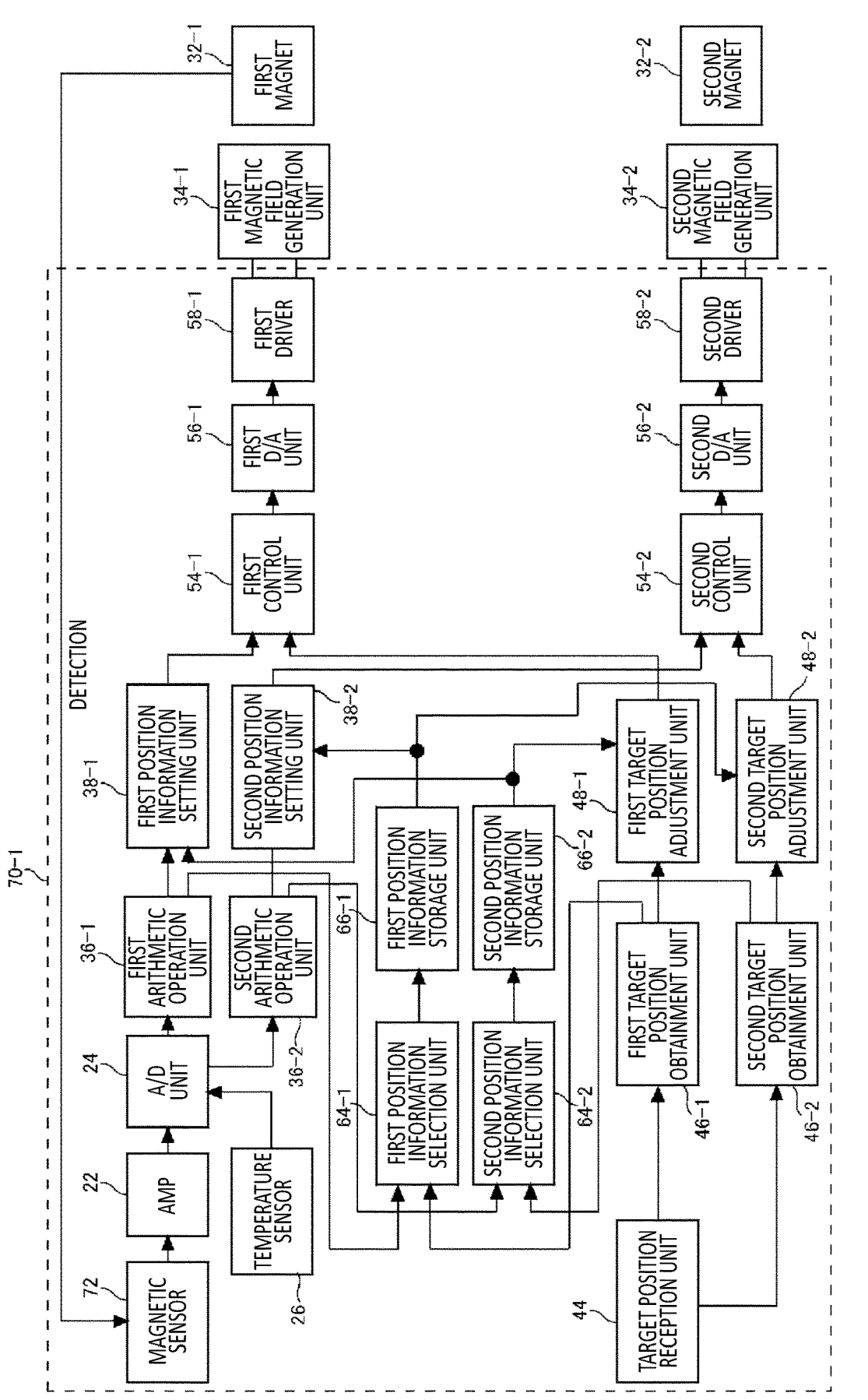
FIG. 15 shows another exemplary configuration of the IC chip 70-1.

FIG. 15 shows another exemplary configuration of the IC chip 70-1. The IC chip 70-1 in FIG. 15 has a first position information selection unit 64-1, a second position information selection unit 64-2, a first position information storage unit 66-1, and a second position information storage unit 66-2 in addition to any one of the configurations shown in FIGS. 7 and 12 to 14. The first position information selection unit 64-1 obtains a result in the first arithmetic operation unit 36-1 and a first target position from the first target position obtainment unit 46-1. The first position information selection unit 64-1 decides which of the result in the first arithmetic operation unit 36-1 and the first target position which have been obtained is to be used as first position information.

The second position information selection unit 64-2 obtains a result in the second arithmetic operation unit 36-2 and a second target position from the second target position obtainment unit 46-2. The second position information selection unit 64-2 decides which of the result in the second arithmetic operation unit 36-2 and the second target position which have been obtained is to be used as second position information.

The first position information storage unit 66-1 stores the first position information decided in the first position information selection unit 64-1. The first position information storage unit 66-1 may have a register memory. The second position information storage unit 66-2 stores the second position information decided in the second position information selection unit 64-2. The second position information storage unit 66-2 may have a register memory. The first position information setting unit 38-1 and the first target position adjustment unit 48-1 may obtain the second position information stored in the second position information storage unit 66-2. The second position information setting unit 38-2 and the second target position adjustment unit 48-2 may obtain the first position information stored in the first position information storage unit 66-1. The first position information setting unit 38-1 may update end point information of a first drive range in a first direction in accordance with the second position information. The second position information setting unit 38-2 may update end point information of a second drive range in a second direction in accordance with the first position information.

When performing correction in a direction perpendicular to an optical axis of light entering the optical element 20, the first position information setting unit 38-1 may correct a first relative position based on a second relative position. When performing correction in a direction parallel to the optical axis of the light entering the optical element 20, the first target position adjustment unit 48-1 may correct the first target position based on the second target position. Position information (a result in the arithmetic operation unit 36) is characterized in that it is updated at shorter intervals than target position information. For example, in a case where it is necessary to quickly follow up a change in a position such as image stabilization, the first position information selection unit 64-1 and the second position information selection unit 64-2 may select the result in the arithmetic operation unit 36 as the position information. On the other hand, in a case where a follow-up interval is relatively long such as when a focal position is controlled, the target position information updated less frequently may be selected as the position information.

Figure 16:
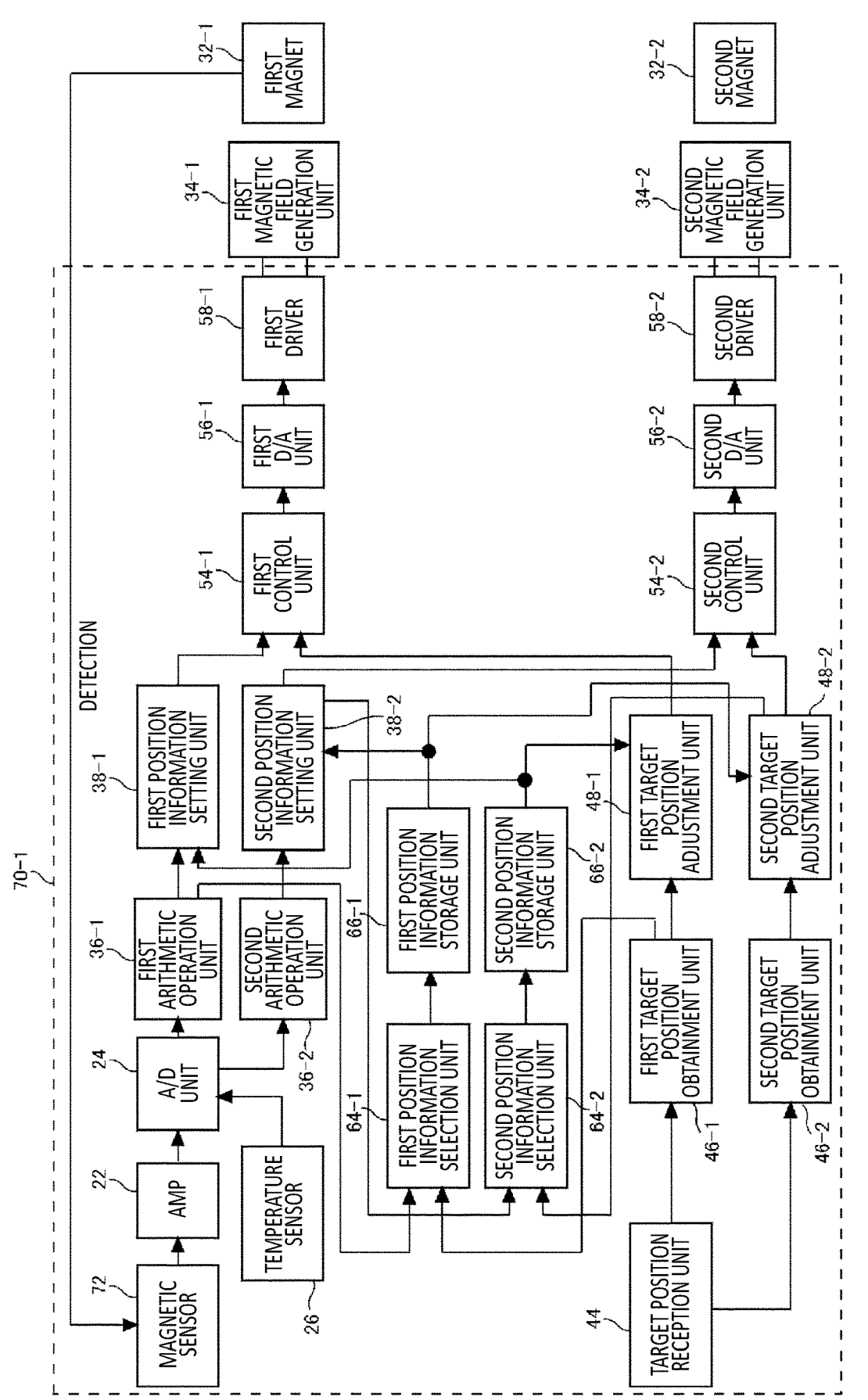
FIG. 16 shows another exemplary configuration of the IC chip 70-1.

FIG. 16 shows another exemplary configuration of the IC chip 70-1. The IC chip 70-1 in FIG. 16 has a configuration different from the configuration shown in FIG. 15 in that the second position information selection unit 64-2 obtains second position information outputted from the second position information setting unit 38-2 and a second target position outputted from the second target position adjustment unit 48-2. Other than this point, it has the same configuration as the exemplary configuration in FIG. 15. If the first arithmetic operation unit 36-1 calculates first position information in a first direction by using a sum of and a difference between the first magnetic field strength B1 and the second magnetic field strength B2, and the second arithmetic operation unit 36-2 calculates second position information in a second direction by using the difference between the first magnetic field strength B1 and the second magnetic field strength B2, the first position information has a better temperature characteristic and is more stable. In this case, the second position information selection unit 64-2 obtaining the second position information corrected in the second position information setting unit 38-2 further reduces an influence of an erroneous motion for the time when another axis has moved.

Figure 17:
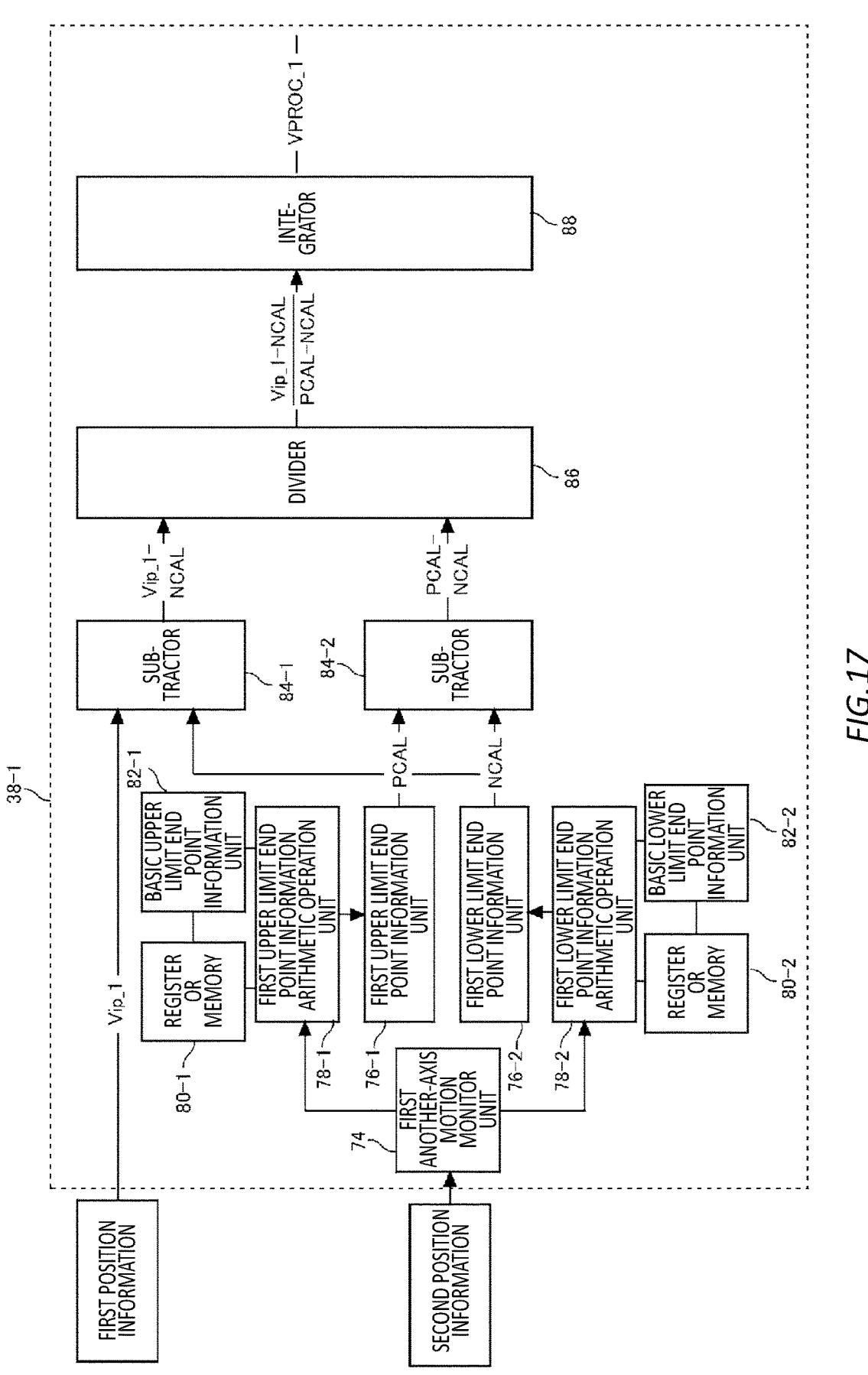
FIG. 17 shows an exemplary configuration of a first position information setting unit 38-1.

FIG. 17 shows an exemplary configuration of the first position information setting unit 38-1. First position information Vip_1 indicating a detection position of the movable body 10 in a first direction and second position information Vip_2 indicating a detection position of the movable body 10 in a second direction are inputted to the first position information setting unit 38-1. The first position information setting unit 38-1 has a first another-axis motion monitor unit 74, a first upper limit end point information arithmetic operation unit 78-1, a register memory unit 80-1, a basic upper limit end point information unit 82-1, a first upper limit end point information unit 76-1, a first lower limit end point information arithmetic operation unit 78-2, a register memory unit 80-2, a basic lower limit end point information unit 82-2, a first lower limit end point information unit 76-2, a subtractor 84-1, a subtractor 84-2, a divider 86, and an integrator 88. The first another-axis motion monitor unit 74 may monitor a motion on another axis. An another-axis motion monitor unit determines whether the movable body 10 is in motion or at rest in a direction other than the first direction. The first another-axis motion monitor unit 74 in the present example monitors a motion of the movable body 10 in the second direction based on the second position information. The second position information may be a second relative position outputted by the second position information setting unit 38-2. After determining whether the movable body 10 is in motion or at rest in the second direction, the first another-axis motion monitor unit 74 transmits the second position information to the first upper limit end point information arithmetic operation unit 78-1 and the first lower limit end point information arithmetic operation unit 78-2. The first position information setting unit 38-1 decides whether a first relative position or a first target position is to be corrected based on determination of the another-axis motion monitor unit. The first position information setting unit 38-1 may update end point information by considering information on the motion on another axis. If the information on the motion on another axis indicates that the movable body 10 is in motion, the first position information setting unit 38-1 may suspend updating the end point information until the movable body 10 is at rest. Even if the information on the motion on another axis indicates that the movable body 10 is in motion, the first position information setting unit 38-1 may update the end point information.

The register memory unit 80-1 previously obtains and stores a parameter for calculating the first relative position. The register memory unit 80-1 may store end point information according to the position on another axis. The end point information may be stored for each position on another axis. The end point information may be obtained by approximating finite end point information at different positions on another axis by using an approximate expression, or may be a parameter of the approximate expression. The end point information may be listed. The parameter may be generated and updated after the IC chip 70-1 is mounted. The basic upper limit end point information unit 82-1 stores the end point information for a case where a position of the movable body 10 on another axis is at an origin. The first upper limit end point information arithmetic operation unit 78-1 arithmetically operates an upper limit of a first drive range by using the second relative position and the information which is stored in the register memory unit 80-1, and outputs a result to the first upper limit end point information unit 76-1. The first upper limit end point information arithmetic operation unit 78-1 may arithmetically operate an upper limit PCAL of the first drive range by using the information in the basic upper limit end point information unit 82-1 as well. The first upper limit end point information unit 76-1 decides the upper limit PCAL of the first drive range.

The register memory unit 80-2 previously obtains and stores a parameter for calculating the first relative position. The register memory unit 80-2 and the basic lower limit end point information unit 82-2 stores the same information as the information in the register memory unit 80-1 and the basic upper limit end point information unit 82-1. The first lower limit end point information arithmetic operation unit 78-2 arithmetically operates a lower limit of the first drive range by using the second relative position and the information which is stored in the register memory unit 80-1, and outputs a result to the first lower limit end point information unit 76-2. The first lower limit end point information arithmetic operation unit 78-2 may arithmetically operate a lower limit NCAL of the first drive range by using the information in the basic lower limit end point information unit 82-2 as well. The first lower limit end point information unit 76-2 decides the lower limit NCAL of the first drive range.

The subtractor 84-2 calculates a first difference PCAL–NCAL between the upper limit PCAL and the lower limit NCAL of the first drive range. The first difference corresponds to a size of the first drive range. The subtractor 84-1 calculates a second difference Vip_1–NCAL between the first position information Vip_1 and the lower limit NCAL of the first drive range. The second difference corresponds to a distance between a position of the lower limit NCAL of the first drive range and a position of the movable body 10 in the first direction. The divider 86 calculates a value obtained by dividing the second difference Vip_1–NCAL by the first difference PCAL–NCAL. The value corresponds to a relative position of the movable body 10 in the first drive range.

The integrator 88 receives an output signal from the divider 86, and outputs VPROC_1=(Vip_1–NCAL)/(PCAL–NCAL)×511. 511 is a numerical value indicating $2^9-1$. This "511" may be arbitrarily changed depending on the upper limit PCAL and the lower limit NCAL of the first drive range.

The second position information setting unit 38-2 may have the same configuration as that of the first position information setting unit 38-1. Similarly to the first position information setting unit 38-1, the second position information setting unit 38-2 may decide whether to correct the second relative position based on determination of the another-axis motion monitor unit. Similarly to the first position information setting unit 38-1, the second position information setting unit 38-2 may arithmetically operate an upper limit and a lower limit of a second drive range.

Figure 18:
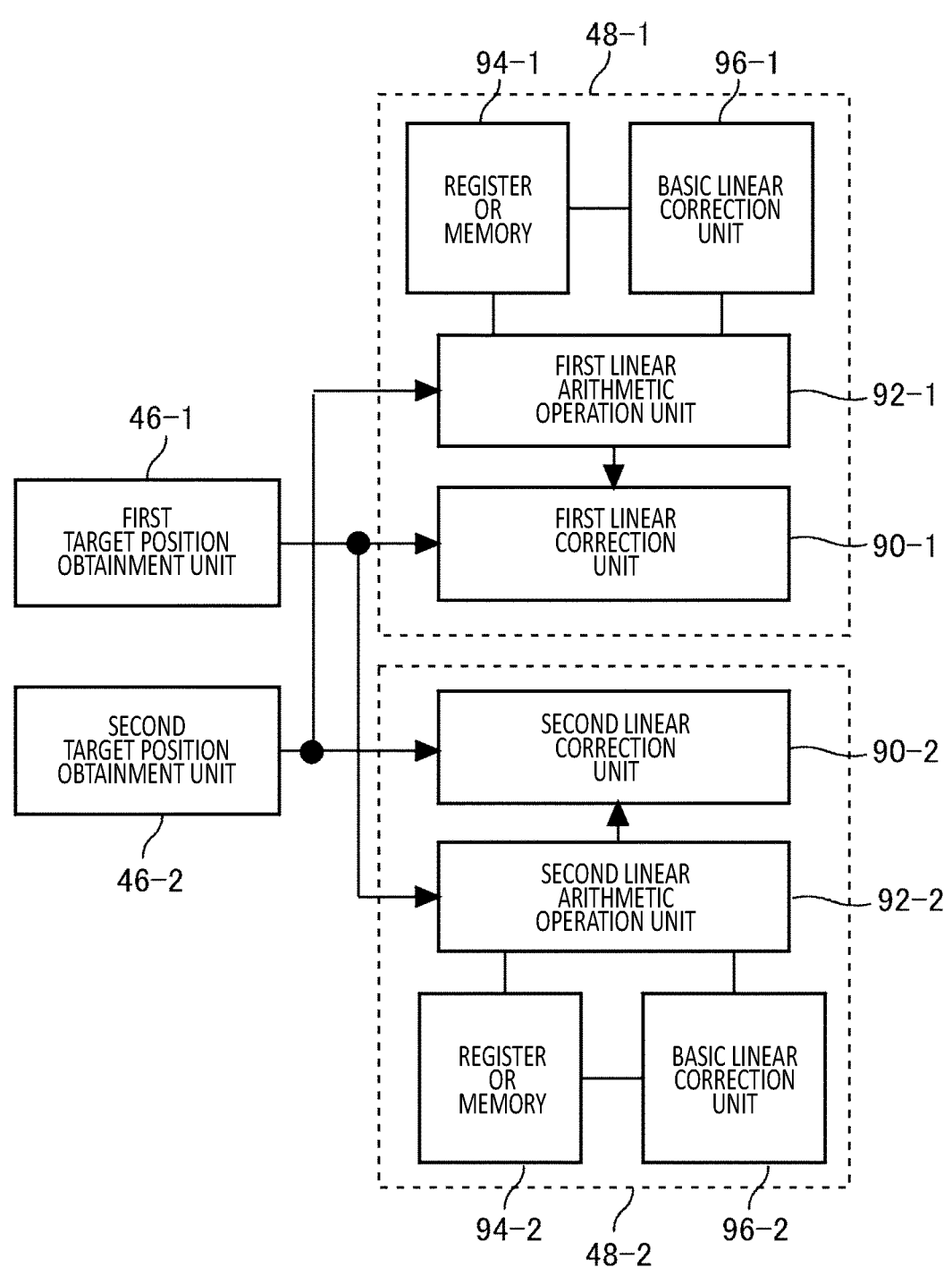
FIG. 18 shows exemplary configurations of a first target position adjustment unit 48-1 and a second target position adjustment unit 48-2.

FIG. 18 shows exemplary configurations of the first target position adjustment unit 48-1 and the second target position adjustment unit 48-2. The first target position adjustment unit 48-1 includes a first linear arithmetic operation unit 92-1, a register memory unit 94-1, a basic linear correction unit 96-1, and a first linear correction unit 90-1. The second target position adjustment unit 48-2 includes a second linear arithmetic operation unit 92-2, a register memory unit 94-2, a basic linear correction unit 96-2, and a second linear correction unit 90-2.

The IC chip 70-1 may further include the first linear correction unit 90-1 and the second linear correction unit 90-2. The first linear correction unit 90-1 in the present example is arranged inside the first target position adjustment unit 48-1, and the second linear correction unit 90-2 is arranged inside the second target position adjustment unit 48-2. The first linear correction unit 90-1 may be arranged inside the first position information setting unit 38-1, and the second linear correction unit 90-2 may be arranged inside the second position information setting unit 38-2. The first linear correction unit 90-1 may correct variations in magnetic fields detected by the plurality of magnetic sensors 72 in a first drive range, and a first relative position or a first target position of the movable body 10. The second linear correction unit 90-2 may correct variations in magnetic fields detected by the plurality of magnetic sensors 72 in a second drive range, and a second relative position or a second target position of the movable body 10.

A parameter may be a parameter of an approximate expression for performing linear correction. The basic linear correction unit 96-1 stores a parameter for a case where a position of the movable body 10 on another axis is at an origin. When performing correction, it is necessary to adjust the parameter for correction in accordance with the position on another axis. The register memory unit 94-1 stores a parameter for performing linear correction if the position on another axis is at a location other than the origin. The parameter may be stored by obtaining a plurality of parameters for each position of the movable body 10 on another axis and expressing the plurality of parameters by the approximate expression.

The first linear arithmetic operation unit 92-1 obtains the second target position from the second target position obtainment unit 46-2. In addition, information obtained by the first linear arithmetic operation unit 92-1 may be the second relative position. The first linear arithmetic operation unit 92-1 derives a new linear correction value from the parameters stored in the register memory unit 94-1 and the basic linear correction unit 96-1 based on the obtained second target position, and outputs it to the first linear correction unit 90-1.

The first linear correction unit 90-1 performs correction based on the second target position. In the present example, the first linear correction unit 90-1 performs correction based on the new linear correction value derived based on the second target position.

Similar processing is performed in the second target position adjustment unit 48-2. The second linear arithmetic operation unit 92-2 derives a new linear correction value based on the first target position, and outputs it to the second linear correction unit 90-2. The second linear correction unit 90-2 performs correction based on at least one of the first relative position or the first target position. In the present example, the second linear correction unit 90-2 performs correction based on the new linear correction value derived based on the first target position.

Figure 19:
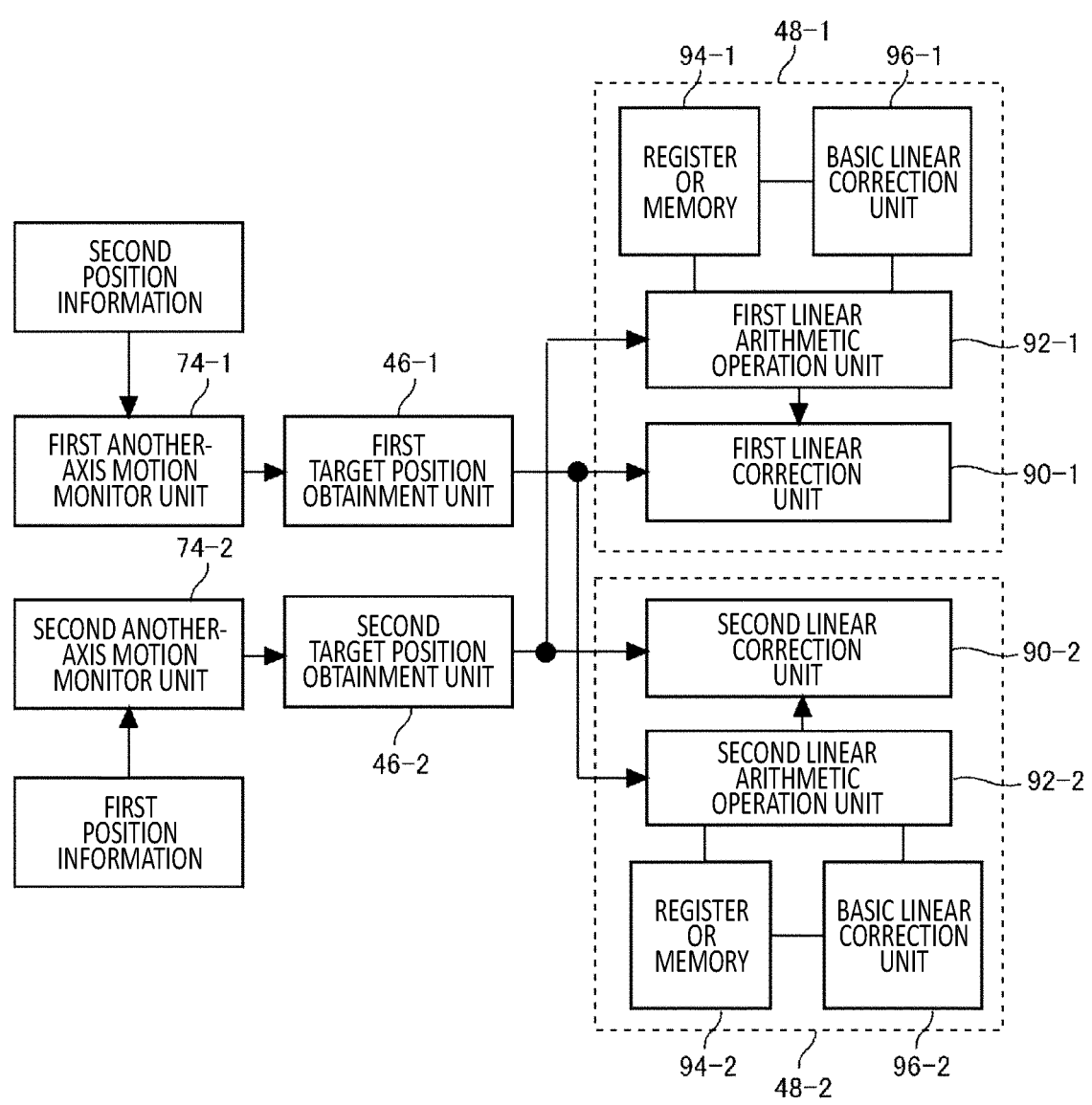
FIG. 19 shows other exemplary configurations of the first target position adjustment unit 48-1 and the second target position adjustment unit 48-2.

FIG. 19 shows other exemplary configurations of the first target position adjustment unit 48-1 and the second target position adjustment unit 48-2. The IC chip 70-1 in the present example has a first another-axis motion monitor unit 74-1 and a second another-axis motion monitor unit 74-2 in addition to the configuration described in FIG. 18. The first another-axis motion monitor unit 74-1 and the second another-axis motion monitor unit 74-2 may be provided inside the first target position adjustment unit 48-1 and the second target position adjustment unit 48-2. In the present example, the first another-axis motion monitor unit 74-1 and the second another-axis motion monitor unit 74-2 are provided short of the first target position obtainment unit 46-1 and the second target position 46-2.

The first another-axis motion monitor unit 74-1 and the second another-axis motion monitor unit 74-2 may select whether a target position on an own axis is to be updated based on information on a position on another axis including a relative position. The first another-axis motion monitor unit 74-1 in the present example selects whether a first target position is to be updated based on a second relative position. The second another-axis motion monitor unit 74-2 in the present example selects whether a second target position is to be updated based on a first relative position.

Figure 20:
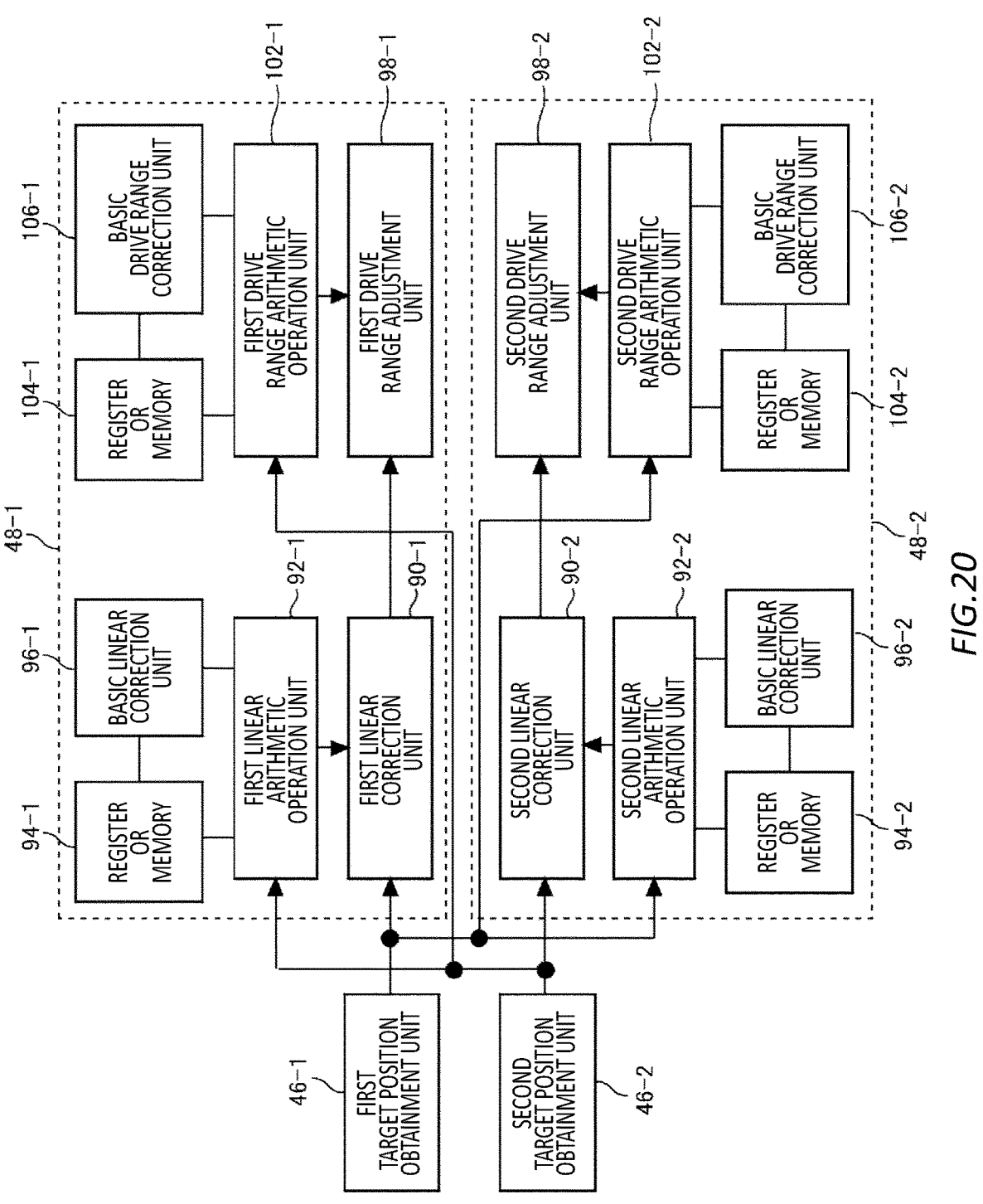
FIG. 20 shows other exemplary configurations of the first target position adjustment unit 48-1 and the second target position adjustment unit 48-2.

FIG. 20 shows other exemplary configurations of the first target position adjustment unit 48-1 and the second target position adjustment unit 48-2. The first target position adjustment unit 48-1 may include a first drive range adjustment unit 98-1, a first drive range arithmetic operation unit 102-1, a register memory unit 104-1, and a basic drive range correction unit 106-1 in addition to the configuration in FIG. 18 or FIG. 19. The second target position adjustment unit 48-2 may include a second drive range adjustment unit 98-2, a second drive range arithmetic operation unit 102-2, a register memory unit 104-2, and a basic drive range correction unit 106-2 in addition to the configuration in FIG. 18 or FIG. 19.

The register memory unit 104-1 may store end point information according to the position on another axis. The end point information may be stored for each position on another axis. The end point information may be obtained by approximating finite end point information at different positions on another axis by using an approximate expression, or may be a parameter of the approximate expression. The end point information may be listed. The parameter may be generated and updated after the IC chip 70-1 is mounted. The basic drive range correction unit 106-1 stores the end point information for a case where a position of the movable body 10 on another axis is at an origin.

The first drive range arithmetic operation unit 102-1 obtains a second target position. The first linear arithmetic operation unit 92-1 derives new end point information from the end point information or the parameters stored in the register memory unit 104-1 and the basic linear correction unit 96-1 based on the obtained second target position, and outputs it to the first drive range adjustment unit 98-1.

The first drive range adjustment unit 98-1 adjusts a first drive range. The first drive range adjustment unit 98-1 may adjust the first drive range based on at least one of a second relative position or a second target position. The first drive range adjustment unit 98-1 in the present example adjusts the first drive range based on the second target position. The first drive range adjustment unit 98-1 may shift the first drive range set by the first position information setting unit 38-1. Instead of the first position information setting unit 38-1 updating the first drive range, the first drive range adjustment unit 98-1 may adjust the first drive range.

Similar processing is performed in the second target position adjustment unit 48-2. The second drive range arithmetic operation unit 102-2 derives the new end point information based on a first target position. The second drive range adjustment unit 98-2 adjusts a second drive range. The second drive range adjustment unit 98-2 may adjust the second drive range based on at least one of a first relative position or the first target position. The second drive range adjustment unit 98-2 in the present example adjusts the second drive range based on the first target position. The second drive range adjustment unit 98-2 may adjust, as the second drive range, a range narrower than the second drive range set by the second position information setting unit 38-2. Instead of the second position information setting unit 38-2 updating the second drive range, the second drive range adjustment unit 98-2 may adjust the second drive range.

Figure 21:
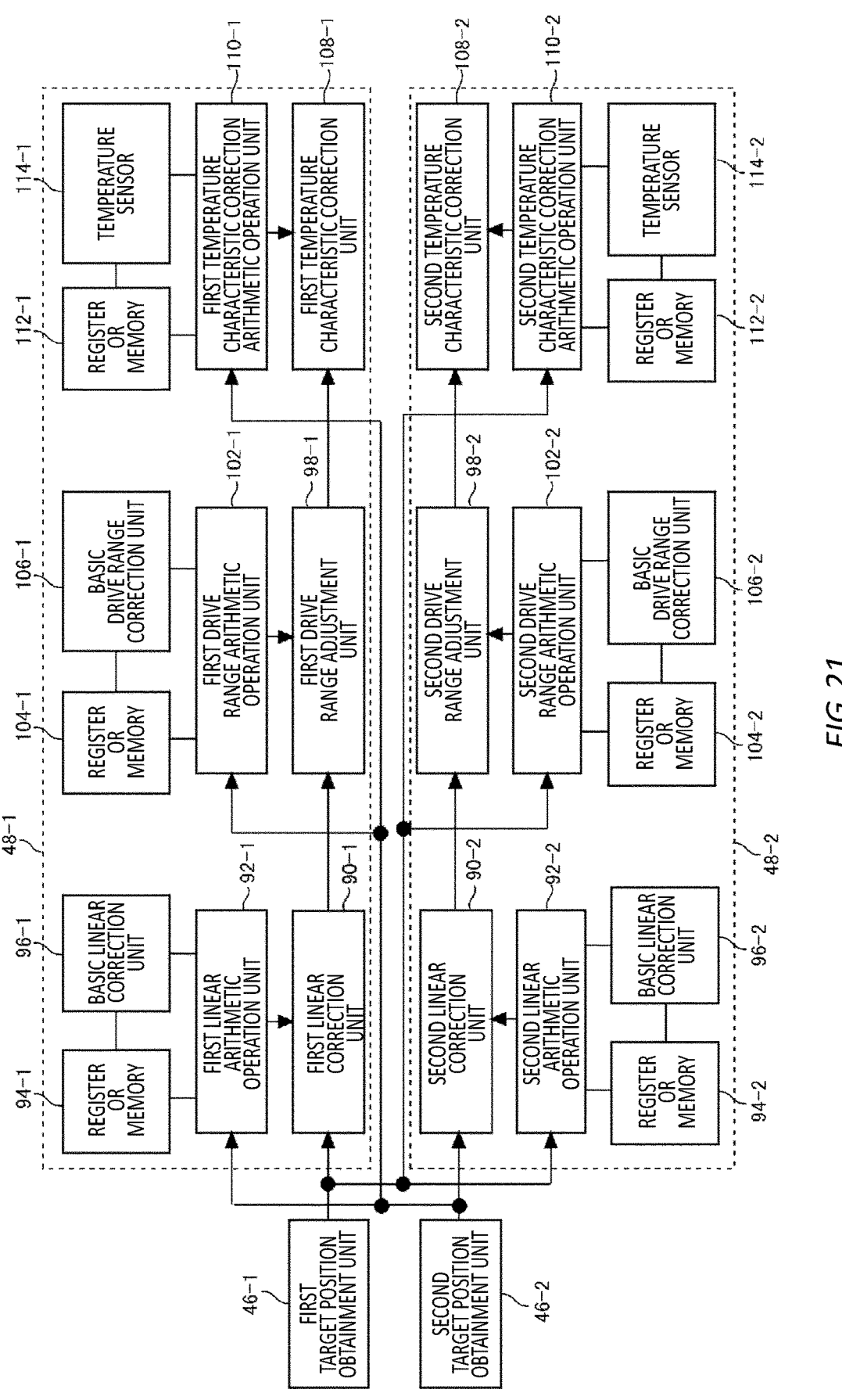
FIG. 21 shows other exemplary configurations of the first target position adjustment unit 48-1 and the second target position adjustment unit 48-2.

FIG. 21 shows other exemplary configurations of the first target position adjustment unit 48-1 and the second target position adjustment unit 48-2. The first target position adjustment unit 48-1 in the present example includes a first temperature characteristic correction unit 108-1, a first temperature characteristic correction arithmetic operation unit 110-1, a register memory unit 112-1, and a temperature sensor 114-1 in addition to the configuration in FIG. 20. The second target position adjustment unit 48-2 in the present example includes a second temperature characteristic correction unit 108-2, a second temperature characteristic correction arithmetic operation unit 110-2, a register memory unit 112-2, and a temperature sensor 114-2 in addition to the configuration in FIG. 20.

A rise in temperature inside the movable body 10 changes a temperature characteristic of a lens and a temperature characteristic of a magnet which are included in the movable body 10, so it is desirable to correct that influence. The register memory unit 112-1 may store temperature characteristic information according to a position on another axis. The information may be stored for each position on another axis. The information may be obtained by approximating finite information at different positions on another axis by using an approximate expression, or may be a parameter of the approximate expression. The information may be listed. The parameter may be generated and updated after the IC chip 70-1 is mounted. The temperature sensor 114-1 measures temperature of the IC chip 70-1 during operation. Without the temperature sensor 114-1 being included in the first target position adjustment unit 48-1, information from a temperature sensor located outside the IC chip 70-1 may be written into the register memory unit 112-1.

The first temperature characteristic correction arithmetic operation unit 110-1 obtains a second target position. In addition, information obtained by the first temperature characteristic correction arithmetic operation unit 110-1 may be a second relative position. The first temperature characteristic correction arithmetic operation unit 110-1 derives new end point information from temperature information and a temperature characteristic which is stored in the register memory unit 112-1 based on the obtained second target position, and outputs it to the first temperature characteristic correction unit 108-1.

The first temperature characteristic correction unit 108-1 adjusts a first drive range based on the second target position. The first temperature characteristic correction unit 108-1 may adjust the first drive range based on the new end point information obtained from the first temperature characteristic correction arithmetic operation unit 110-1. The first temperature characteristic correction unit 108-1 in the present example adjusts the first drive range based on the second target position. Similarly, the second temperature characteristic correction unit 108-2 adjusts a second drive range based on at least one of a first relative position or a first target position. The second temperature characteristic correction unit 108-2 in the present example adjusts the second drive range based on the first target position. The second temperature characteristic correction unit 108-2 may adjust the second drive range based on the new end point information obtained from the second temperature characteristic correction arithmetic operation unit 110-2. This allows correction of changes in the temperature characteristic of the lens and the temperature characteristic of the magnet due to a change in the temperature inside the movable body 10.

Figure 22:
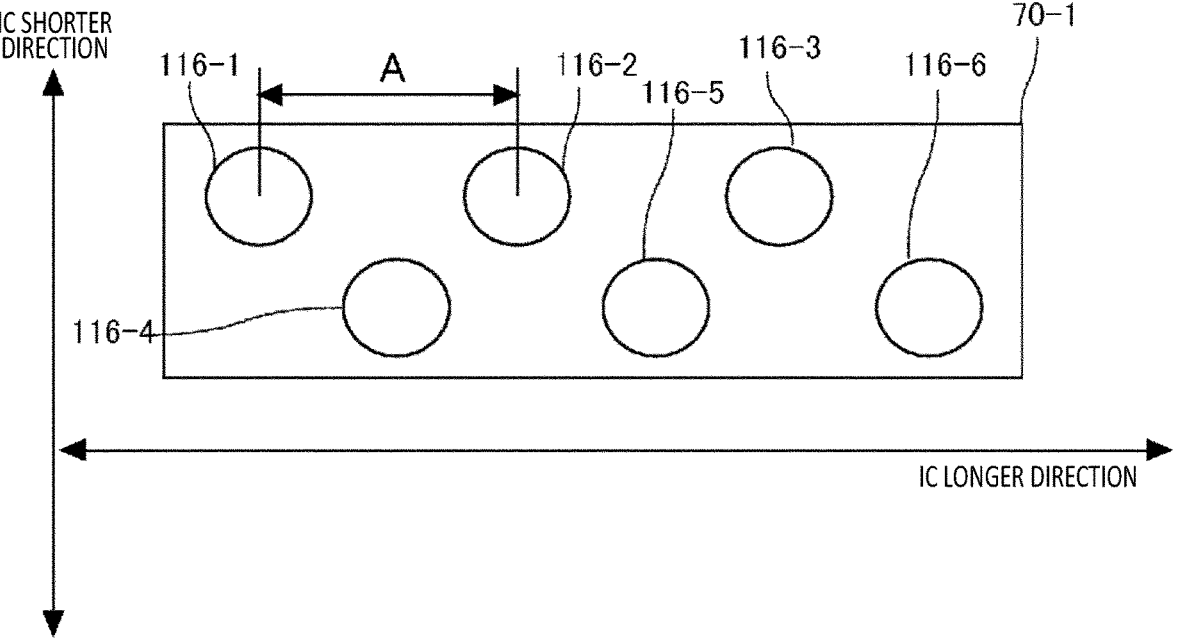
FIG. 22 illustrates a terminal arrangement of the IC chip 70-1.

FIG. 22 illustrates a terminal arrangement of the IC chip 70-1. Any one of the IC chips 70-1 in FIGS. 1 to 21 may have the terminal arrangement shown in FIG. 22. The IC chip 70-1 has terminals 116-1 to 116-6. The terminal arrangement of the IC chip 70-1 in the present example is a staggered arrangement. In the IC chip 70-1 in the present example, a position of one terminal is arranged at a position different from a position of another terminal in a shorter direction of the IC chip 70-1.

Arranging the terminals in a staggered manner can increase a distance between the adjacent terminals 116-1 and 116-2 (A in the figure) as compared to a case where the terminals are arranged in a normal lattice pattern, which can increase a degree of freedom in rewiring. In addition, since there are no terminals 116-1 to 116-6 in the shorter direction as well, there is an advantage that wiring lines can be easily run. While it is difficult, especially in a latticed arrangement, to run the wiring lines from the terminals along a longer direction, it is easy, in the staggered arrangement, to lay the wiring lines in the longer direction because distances between the terminals 116-1 to 116-6 are wider than in the latticed arrangement, which can increase a degree of freedom in design.

Figure 23:
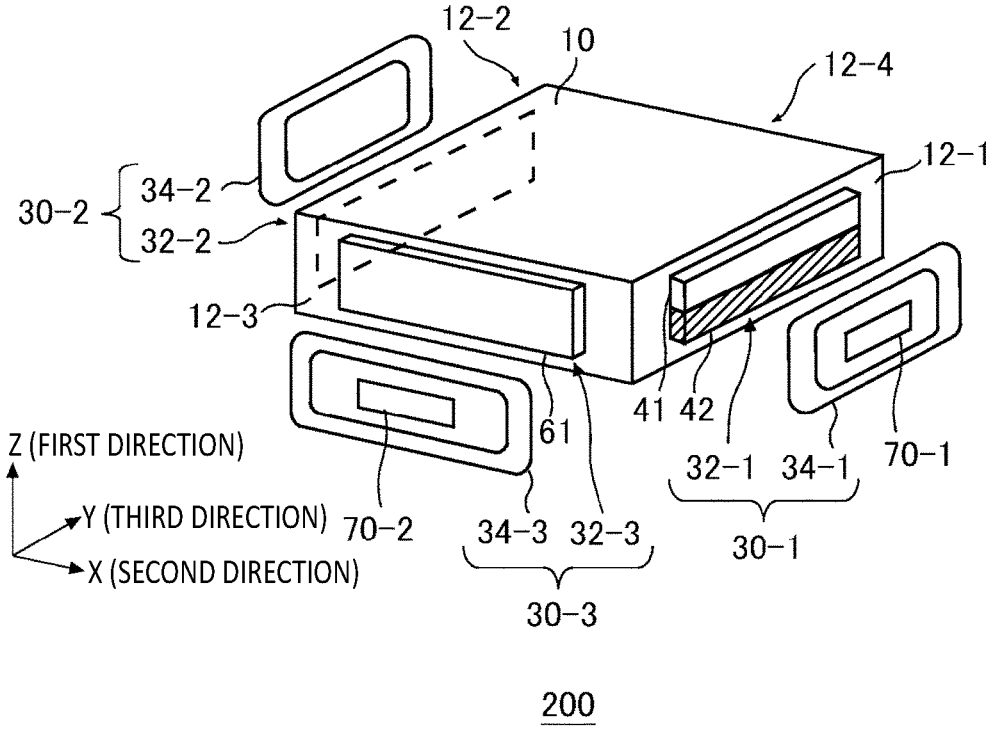
FIG. 23 is a perspective view showing an example of a position control system 200 according to another embodiment of the present invention.

FIG. 23 is a perspective view showing an example of a position control system 200 according to another embodiment of the present invention. The position control system 200 may include at least some of configurations other than the optical element 20, among the configurations of the camera module 100 described in FIG. 1 to FIG. 22. The position control system 200 in the present example includes all of the configurations other than the optical element 20, among the configurations of the camera module 100. Functions or the like of the configurations included in the position control system 200 are similar to those of the camera module 100 described in FIG. 1 to FIG. 22. The position control system 200 may also be used for applications other than a camera.

While the present invention has been described by using the embodiments, the technical scope of the present invention is not limited to the scope described in the above-described embodiments. It is apparent to persons skilled in the art that various alterations or improvements can be added to the above-described embodiments. It is also apparent from the description of the claims that the embodiments added with such alterations or improvements can be included in the technical scope of the present invention.

It should be noted that the operations, procedures, steps, stages, and the like of each processing performed by an apparatus, system, program, and method shown in the claims, specification, or drawings can be performed in any order as long as the order is not indicated by "prior to," "before," or the like and as long as the output from a previous processing is not used in a later processing. Even if the operation flow is described using phrases such as "first" or "next" for the sake of convenience in the claims, specification, or drawings, it does not necessarily mean that the process must be performed in this order.

EXPLANATION OF REFERENCES

10: movable body, 12: surface, 12-1: first surface, 12-2: second surface, 12-3: third surface, 12-4: fourth surface, 14: fixed portion, 16: surface, 16-1: first surface, 16-2: second surface, 16-3: third surface, 16-4: fourth surface, 20: optical element, 22: AMP, 24: A/D unit, 26: temperature sensor, 30: drive unit, 30-1: first drive unit, 30-2: second drive unit, 30-3: third drive unit, 32: magnet, 32-1: first magnet, 32-2: second magnet, 32-3: third magnet, 34: magnetic field generation unit, 34-1: first magnetic field generation unit, 34-2: second magnetic field generation unit, 34-3: third magnetic field generation unit, 36: arithmetic operation unit, 36-1: first arithmetic operation unit, 36-2: second arithmetic operation unit, 36-3: third arithmetic operation unit, 37-1: adding circuit, 37-2: subtracting circuit, 37-3: dividing circuit, 38-1: first position information setting unit, 38-2: second position information setting unit, 38-3: third position information setting unit, 41: first portion, 42: second portion, 44: target position reception unit, 46-1: first target position obtainment unit, 46-2: second target position obtainment unit, 46-3: third target position obtainment unit, 48-1: first target position adjustment unit, 48-2: second target position adjustment unit, 48-3: third target position adjustment unit, 54-1: first control unit, 54-2: second control unit, 54-3: third control unit, 56-1: first D/A unit, 56-2: second D/A unit, 56-3: third D/A unit, 58-1: first driver, 58-2: second driver, 58-3: third driver, 61: first portion, 64-1: first position information selection unit, 64-2: second position information selection unit, 66-1: first position information storage unit, 66-2: second position information storage unit, 70: IC chip, 70-1: IC chip, 70-2: IC chip, 71: position detection unit, 72: magnetic sensor, 72-1: first magnetic sensor, 72-2: second magnetic sensor, 74: first another-axis motion monitor unit, 74-1: first another-axis motion monitor unit, 74-2: second another-axis motion monitor unit, 76-1: first upper limit end point information unit, 76-2: first lower limit end point information unit, 78-1: first upper limit end point information arithmetic operation unit, 78-2: first lower limit end point information arithmetic operation unit, 80-1: register memory unit, 80-2: register memory unit, 82-1: basic upper limit end point information unit, 82-2: basic lower limit end point information unit, 84-1: subtractor, 84-2: subtractor, 86: divider, 88: integrator, 90-1: first linear correction unit, 90-2: second linear correction unit, 92-1: first linear arithmetic operation unit, 92-2: second linear arithmetic operation unit, 94-1: register memory unit, 94-2: register memory unit, 96-1: basic linear correction unit, 96-2: basic linear correction unit, 98-1: first drive range adjustment unit, 98-2: second drive range adjustment unit, 100: camera module, 102-1: first drive range arithmetic operation unit, 102-2: second drive range arithmetic operation unit, 104-1: register memory unit, 104-2: register memory unit, 106-1: basic drive range correction unit, 106-2: basic drive range correction unit, 108-1: first temperature characteristic correction unit, 108-2: second temperature characteristic correction unit, 110-1: first temperature characteristic correction arithmetic operation unit, 110-2: second temperature characteristic correction arithmetic operation unit, 112-1: register memory unit, 112-2: register memory unit, 114-1: temperature sensor, 114-2: temperature sensor, 116-1: terminal, 116-2: terminal, 116-3: terminal, 116-4: terminal, 116-5: terminal, 116-6: terminal.

What is claimed is:

1. An IC chip for detecting positions, in a first direction and a second direction, of a movable body including an optical element and for driving the movable body in the first direction and the second direction, the IC chip comprising:
   a plurality of magnetic sensors which detect magnetic fields according to the positions of the movable body in the first direction and the second direction;
   a processor;
   a first position information setting unit which calculates, using the processor, a first relative position of the movable body with respect to a first drive range in the first direction in accordance with the magnetic fields detected by the plurality of magnetic sensors;
   a second position information setting unit which calculates, using the processor, a second relative position of the movable body with respect to a second drive range in the second direction in accordance with the magnetic fields detected by the plurality of magnetic sensors,
   a first target position adjustment unit which calculates, using the processor, a first target position in the first drive range; and
   a second target position adjustment unit which calculates, using the processor, a second target position in the second drive range,
   wherein
   the first position information setting unit and the first target position adjustment unit correct at least one of the second relative position or the second target position based on at least one of the first relative position or the first target position;
   the first direction and the second direction intersect one another;
   the IC chip is a single IC chip in which the plurality of magnetic sensors and the processor are integral thereto;
   the IC chip is arranged on a surface of the movable body or a surface of a fixed portion that faces the surface of the movable body;
   the movable body includes a first magnet and a second magnet;
   the first magnet includes a first portion having a first polarity and a second portion having a second polarity;
   the first portion and the second portion are arranged side by side in the first direction or the second direction;
   the plurality of magnetic sensors includes a first magnetic sensor arranged facing the first portion and a second magnetic sensor arranged facing the second portion;
   the first magnetic sensor detects a first magnetic field strength;
   the second magnetic sensor detects a second magnetic field strength; and
   the processor further comprises:
      a first arithmetic operation unit which calculates a position of the movable body in the first direction based on at least one of a sum of, a difference between, or the sum of/the difference between, the first magnetic field strength and the second magnetic field strength; and a second arithmetic operation unit which calculates a position of the movable body in the second direction based on at least one of the sum of or the difference between the first magnetic field strength and the second magnetic field strength.

2. The IC chip according to claim 1, further comprising:

a first driver which drives the movable body in the first direction based on the first relative position of the movable body in the first direction; and a second driver which drives the movable body in the second direction based on the second relative position of the movable body in the second direction.

3. The IC chip according to claim 1, wherein the second position information setting unit and the second target position adjustment unit use the processor to correct at least one of the second relative position or the second target position based on at least one of the first relative position or the first target position.

4. The IC chip according to claim 1, wherein the first position information setting unit uses the processor to sequentially calculates the first relative position based on the second relative position of the movable body in the second direction.

5. The IC chip according to claim 1, wherein the first position information setting unit uses the processor to access memory which previously obtained and stored a parameter for calculating the first relative position.

6. The IC chip according to claim 1, wherein the first position information setting unit and the second position information setting unit uses the processor to update the first drive range and the second drive range.

7. The IC chip according to claim 1, wherein when performing correction in a direction perpendicular to an optical axis of light entering the optical element, the first position information setting unit uses the processor to corrects the first relative position based on the second relative position, and when performing correction in a direction parallel to the optical axis of the light entering the optical element, the first target position adjustment unit uses the processor to corrects the first target position based on the second target position.

8. The IC chip according to claim 1, wherein the first direction and the second direction are two directions among a direction parallel to, a direction perpendicular to, or a rotational direction around, an optical axis of light entering the optical element.

9. The IC chip according to claim 1, wherein at least two of the plurality of magnetic sensors are arranged along a direction other than the first direction and the second direction.

10. An IC chip for detecting positions, in a first direction and a second direction, of a movable body including an optical element and for driving the movable body in the first direction and the second direction, the IC chip comprising:

a plurality of magnetic sensors which detect magnetic fields according to the positions of the movable body in the first direction and the second direction;

a processor;

a first position information setting unit which calculates, using the processor, a first relative position of the movable body with respect to a first drive range in the first direction in accordance with the magnetic fields detected by the plurality of magnetic sensors;

a second position information setting unit which calculates, using the processor, a second relative position of the movable body with respect to a second drive range in the second direction in accordance with the magnetic fields detected by the plurality of magnetic sensors, a first target position adjustment unit which calculates, using the processor, a first target position in the first drive range; and a second target position adjustment unit which calculates, using the processor, a second target position in the second drive range, wherein the first position information setting unit and the first target position adjustment unit correct at least one of the first relative position or the first target position based on at least one of the second relative position or the second target position;

the first direction and the second direction intersect one another;

the IC chip is a single IC chip in which the plurality of magnetic sensors and the processor are integral thereto;

the IC chip is arranged on a surface of the movable body or a surface of a fixed portion that faces the surface of the movable body;

the first position information setting unit includes a first another-axis motion monitor unit, the first another-axis motion monitor unit determines, using the processor, whether the movable body is in motion or at rest in a direction other than the first direction, and the first position information setting unit decides, using the processor, whether the first relative position or the first target position is to be corrected based on determination of the first another-axis motion monitor unit.

11. An IC chip for detecting positions, in a first direction and a second direction, of a movable body including an optical element and for driving the movable body in the first direction and the second direction, the IC chip comprising:

a plurality of magnetic sensors which detect magnetic fields according to the positions of the movable body in the first direction and the second direction;

a processor;

a first position information setting unit which calculates, using the processor, a first relative position of the movable body with respect to a first drive range in the first direction in accordance with the magnetic fields detected by the plurality of magnetic sensors;

a second position information setting unit which calculates, using the processor, a second relative position of the movable body with respect to a second drive range in the second direction in accordance with the magnetic fields detected by the plurality of magnetic sensors, a first target position adjustment unit which calculates, using the processor, a first target position in the first drive range; and a second target position adjustment unit which calculates, using the processor, a second target position in the second drive range, wherein the first position information setting unit and the first target position adjustment unit correct at least one of the first relative position or the first target position based on at least one of the second relative position or the second target position;

the first direction and the second direction intersect one another;

the IC chip is a single IC chip in which the plurality of magnetic sensors and the processor are integral thereto;

the IC chip is arranged on a surface of the movable body or a surface of a fixed portion that faces the surface of the movable body; and the first position information setting unit further includes:
a register memory;
a first upper limit end point information unit and a first lower limit end point information unit which, using the processor, decide an upper limit and a lower limit of the first drive range; and
a first upper limit end point information arithmetic operation unit and a first lower limit end point information arithmetic operation unit which uses the processor to arithmetically operate the upper limit and the lower limit of the first drive range by using the second relative position and information that is stored in the register memory unit and which output a result to the first upper limit end point information unit and the first lower limit end point information unit.

12. An IC chip for detecting positions, in a first direction and a second direction, of a movable body including an optical element and for driving the movable body in the first direction and the second direction, the IC chip comprising:
a plurality of magnetic sensors which detect magnetic fields according to the positions of the movable body in the first direction and the second direction;
a processor;
a first position information setting unit which calculates, using the processor, a first relative position of the movable body with respect to a first drive range in the first direction in accordance with the magnetic fields detected by the plurality of magnetic sensors;
a second position information setting unit which calculates, using the processor, a second relative position of the movable body with respect to a second drive range in the second direction in accordance with the magnetic fields detected by the plurality of magnetic sensors,
a first target position adjustment unit which calculates, using the processor, a first target position in the first drive range;
a second target position adjustment unit which calculates, using the processor, a second target position in the second drive range,
a first linear correction unit which, using the processor, corrects variations in the magnetic fields detected by the plurality of magnetic sensors in the first drive range and the first relative position or the first target position of the movable body; and a second linear correction unit which, using the processor, corrects variations in the magnetic fields detected by the plurality of magnetic sensors in the second drive range and the second relative position or the second target position of the movable body, wherein the first position information setting unit and the first target position adjustment unit correct at least one of the first relative position or the first target position based on at least one of the second relative position or the second target position;

the first direction and the second direction intersect one another;

the IC chip is a single IC chip in which the plurality of magnetic sensors and the processor are integral thereto;

the IC chip is arranged on a surface of the movable body or a surface of a fixed portion that faces the surface of the movable body; and the first linear correction unit uses the processor to performs correction based on at least one of the second relative position or the second target position.

13. The IC chip according to claim 12, wherein the first linear correction unit is arranged inside the first target position adjustment unit, and the second linear correction unit is arranged inside the second target position adjustment unit.

14. The IC chip according to claim 13, wherein the first target position adjustment unit further includes a first drive range adjustment unit which, using the processor, adjusts the first drive range, the second target position adjustment unit further includes a second drive range adjustment unit which, using the processor, adjusts the second drive range, and the first drive range adjustment unit uses the processor to adjusts the first drive range based on at least one of the second relative position or the second target position.

15. The IC chip according to claim 14, wherein the first target position adjustment unit further includes a first temperature characteristic correction unit, the second target position adjustment unit further includes a second temperature characteristic correction unit, and the first temperature characteristic correction unit adjusts, using the processor, the first drive range based on at least one of the second relative position or the second target position.

16. The IC chip according to claim 12, wherein the second linear correction unit, using the processor, performs correction based on at least one of the first relative position or the first target position.

* * * * *